United States Patent
Asad et al.

(10) Patent No.: US 11,761,479 B2
(45) Date of Patent: *Sep. 19, 2023

(54) MECHANICAL SYSTEM HAVING HIGH ROTATION FLEXURE BEARING

(71) Applicant: Prince Mohammad Bin Fahd University, Dhahran (SA)

(72) Inventors: Muhammad Asad, Dhahran (SA); Muhammad Azhar Ali Khan, Dhahran (SA); Mohammed Alhulaimi, Dhahran (SA); Majed Inkis, Dhahran (SA)

(73) Assignee: Prince Mohammad Bin Fahd University, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/049,666

(22) Filed: Oct. 26, 2022

(65) Prior Publication Data

US 2023/0167847 A1    Jun. 1, 2023

Related U.S. Application Data

(63) Continuation of application No. 17/730,943, filed on Apr. 27, 2022, now Pat. No. 11,555,517, which is a
(Continued)

(51) Int. Cl.
*F16C 11/12* (2006.01)
(52) U.S. Cl.
CPC .............. *F16C 11/12* (2013.01); *Y10T 403/45* (2015.01); *Y10T 403/459* (2015.01)

(58) Field of Classification Search
CPC .... F16C 11/12; Y10T 403/45; Y10T 403/451; Y10T 403/452; Y10T 403/453; Y10T 403/459; Y10T 403/54
See application file for complete search history.

(56) References Cited

U.S. PATENT DOCUMENTS

| 1,617,666 A | 2/1927 | Cattaneo |
| 3,168,263 A | 2/1965 | Kamm |

(Continued)

FOREIGN PATENT DOCUMENTS

EP    3 140 557 B1    10/2019

OTHER PUBLICATIONS

Lang Liu, et al. ; Design and experiment of generalized triple-cross-spring flexure pivots applied to the ultra-precision instruments ; Review of Scientific Instruments 85 ; 2014 ; 12 Pages.

*Primary Examiner* — Michael P Ferguson
(74) *Attorney, Agent, or Firm* — Oblon, McClelland, Maier & Neustadt, L.L.P.

(57) ABSTRACT

A flexure bearing having a first sleeve and a second sleeve is provided. Each sleeve includes a first pillar having a first end attached to the sleeve and a second end projecting outwardly from the sleeve and a second pillar having a first end attached to the sleeve and a second end projecting outwardly from the sleeve parallel to and diametrically opposed to the first pillar. The flexure bearing has a plurality of blind holes and a plurality of compression springs, each compression spring having a first spring end fit into one of the blind holes of a pillar of the first sleeve and a second spring end fit into a corresponding blind hole of an adjacent pillar of the second sleeve when the second sleeve is interconnected to the first sleeve.

10 Claims, 15 Drawing Sheets

Related U.S. Application Data continuation of application No. 17/537,592, filed on Nov. 30, 2021, now Pat. No. 11,346,392.

(56) References Cited

U.S. PATENT DOCUMENTS

| | | |
|---|---|---|
| 3,360,255 A | 12/1967 | Ormond |
| 3,706,465 A | 12/1972 | Olowinski |
| 4,997,123 A | 3/1991 | Backus |
| 5,335,418 A | 8/1994 | Krivec |
| 6,666,612 B2 | 12/2003 | Lorigny |
| 8,556,533 B2 | 10/2013 | Bullard |
| 11,346,392 B1 | 5/2022 | Asad |
| 11,555,517 B1 * | 1/2023 | Asad ........................ F16C 11/12 |
| 11,661,968 B1 * | 5/2023 | Asad ........................ F16C 11/12 403/120 |
| 2020/0008827 A1 | 1/2020 | Dearden et al. |

* cited by examiner

MECHANICAL SYSTEM HAVING HIGH ROTATION FLEXURE BEARING

CROSS-REFERENCE TO RELATED APPLICATIONS

The present application is a Continuation of U.S. application Ser. No. 17/730,943, now allowed, having a filing date of Apr. 27, 2022 which is a Continuation of U.S. application Ser. No. 17/537,592, now U.S. Pat. No. 11,346,392, having a filing date of Nov. 30, 2021.

BACKGROUND

Technical Field

The present disclosure is directed to bearings used for compliant mechanisms and, more particularly, relates to flexure bearings and methods of assembling the flexure bearings.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Bearings are generally used in various industrial applications to facilitate rotational or linear movement between two components. When such bearings are used for relative movements between two components, lubrication is applied in the bearings to ease operation thereof and to minimize wear in the moving components, which in turn increase productive life of the components. In some industrial applications, bearings may be used for facilitating movement between two or three elements, however, there is a restriction or limitation to use lubricants for the bearings. In such kind of applications, flexure bearings are used to serve the same function as of the conventional bearings to facilitate movement between the elements, however, the flexure bearings provide limited angle of rotation. Also, the flexure bearings eliminate the need of lubrication.

In the existing designs, the movement of the flexure bearings is achieved by deformation of blade flexures, which experience cyclic fatigue loads. Further, the angle of rotation achieved in the existing flexure bearing design is ±20 degrees. Conventional flexure bearings experience fatigue failure due to cyclic loads and thus the blade design may not be a viable solution in an application that is exposed to vibration which may cause damage or lead to failure of the equipment. Also, acceptable corrosion rate of the existing design is limited because of tight dimensional tolerance between the blades and housing of the flexure bearings. Hence, there remains a need to develop a flexure bearing that overcomes the aforementioned shortcomings of the existing flexure bearing design. Further, the existing designs suffer from one or more drawbacks hindering their adoption.

Accordingly, it is one object of the present disclosure to provide a flexure bearing that has enhanced fatigue life and can be useful for application that is exposed to vibration.

SUMMARY

In an exemplary embodiment, a flexure bearing is described. The flexure bearing includes a first sleeve and a second sleeve. Each sleeve includes a first pillar having three sides, and a first end of the first pillar is attached to an inside wall of the sleeve, and a second end of the first pillar projects outwardly from the sleeve parallel to an axis of the sleeve. Each sleeve further includes a second pillar having three sides, and a first end of the second pillar is attached to the inside wall of the sleeve, and a second end of the second pillar projects outwardly from the sleeve such that the second pillar is parallel to and diametrically opposed to the first pillar. The flexure bearing further includes a plurality of blind holes, each blind hole near each of the first end and the second end of each pillar. The flexure bearing further includes a plurality of compression springs, each compression spring having a first spring end configured to fit into one of the blind holes of a pillar of the first sleeve and a second spring end configured to fit into a corresponding blind hole of an adjacent pillar of the second sleeve when the second sleeve is interconnected to the first sleeve.

In another exemplary embodiment, a double-ended flexure bearing is described. The double-ended flexure bearing includes a first outer sleeve including a first pillar which projects outwardly from the first outer sleeve in a first direction, a second outer sleeve including a second pillar which projects outwardly from the second outer sleeve in a second direction, and a central rotor ring having an axis concentric with the first outer sleeve and the second outer sleeve. The central rotor ring is configured to engage with and connect to the first outer sleeve and the second outer sleeve along the axis. The central rotor ring includes a third pillar which projects outwardly from the central rotor ring in the first direction and in the second direction, a fourth pillar which projects outwardly from the central rotor ring in the first direction and in the second direction, and a plurality of blind holes in each pillar. The double-ended flexure bearing further includes a plurality of compression springs configured to connect each of the plurality of blind holes of each pillar to a blind hole of an adjacent pillar, such that the first outer sleeve abuts a first edge of the central rotor ring and the second outer sleeve abuts a second edge of the central rotor ring.

In another exemplary embodiment, a method of assembling a flexure bearing is described. The method incudes inserting each first spring end of each compression spring of a plurality of compression springs into a blind hole of a pillar attached to a first sleeve, and inserting each second spring end of each compression spring into a corresponding blind hole of an adjacent pillar attached to one of a second sleeve and a central rotor ring.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
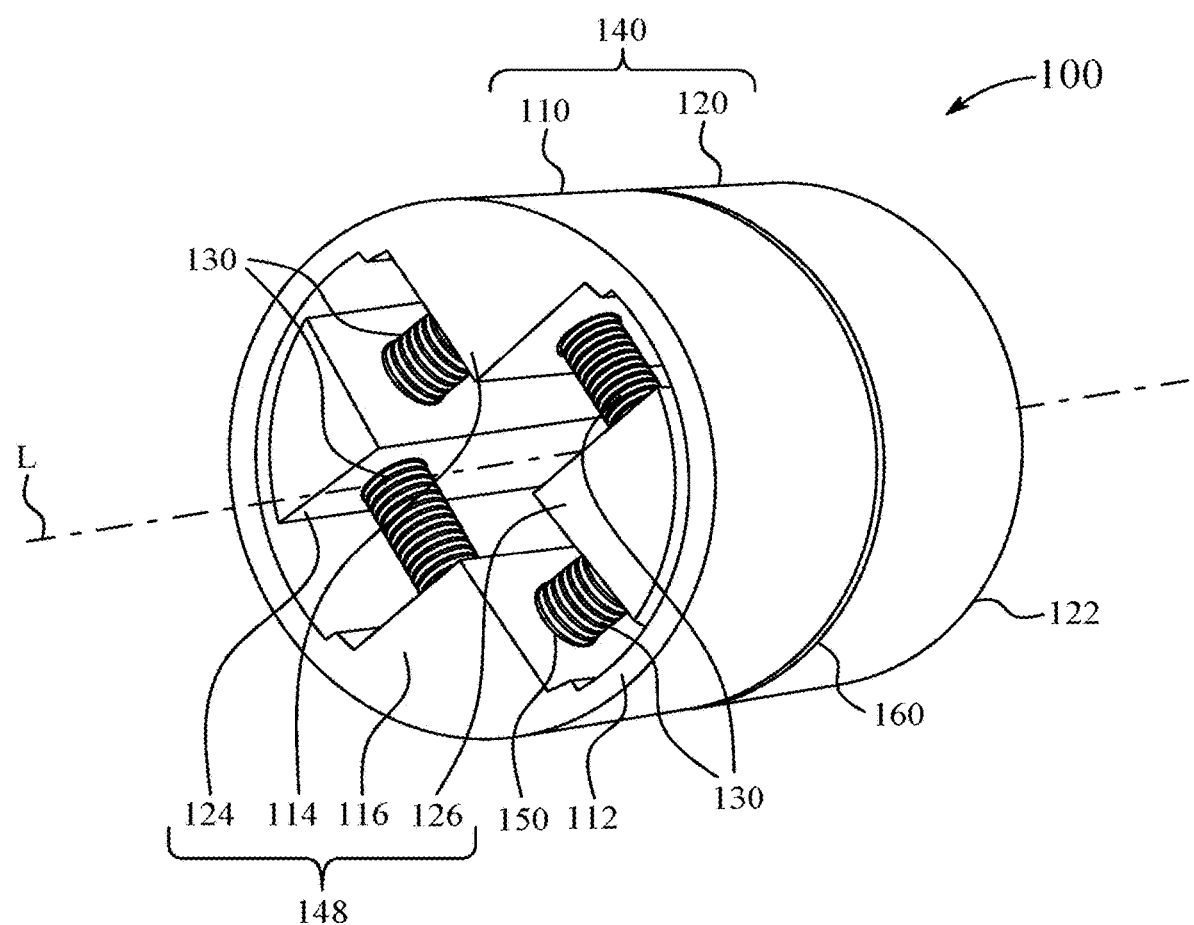
FIG. 1 is a perspective view of a flexure bearing, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

The word compliant as used in the present disclosure is defined as flexible, i.e., able to bend.

In a non-limiting example, a compliant mechanism may be a robotic joint. In another non-limiting example, a compliant mechanism may be any one of a strut joint, a tie rod joint, a steering shaft joint, and the like.

Aspects of this disclosure are directed to a single-ended flexure bearing and a double-ended flexure bearing for compliant mechanisms used in industrial applications and methods of assembling the flexure bearings. The flexure bearing includes two or three sleeves each having one or more pillars connected through multiple compression springs. Each compression spring is disposed between two adjacent pillars and mounted on blind holes provided in opposing side surfaces of the adjacent pillars. The compression springs are positioned between the adjacent pillars in compression state such that they are firmly mounted within the flexure bearing.

The bearing of the present disclosure may be used in applications such as precision measuring equipment, a spacecraft thruster, an antenna, in solar array systems, as a haptic pantograph mechanism, an antenna pointing mechanism, scanning space mechanisms, and the like.

Referring to FIG. 1, a perspective view of a flexure bearing 100 is illustrated. The flexure bearing 100 includes a first sleeve 110 and a second sleeve 120 coupled to each other with a plurality of compression springs 130. The first sleeve 110 includes a first circular body 112 having a first pillar 114 and a second pillar 116 attached thereto and the second sleeve 120 includes a second circular body 122 having a first pillar 124, which is otherwise referred to as 'the third pillar 124', and a second pillar 126, which is otherwise referred to as 'the fourth pillar 126', attached thereto. The first sleeve 110 and the second sleeve 120 are collectively referred to as 'the sleeves 140' and individually referred to as 'the sleeve 140' unless otherwise specifically mentioned. In particular, the first pillar 114 and the second pillar 116 of the first sleeve 110 are attached to the first circular body 112 such that they are diametrically opposite to each other. Further, the first pillar 114 and the second pillar 116 of the first sleeve 110 are integrally formed with the first circular body 112. Alternatively, the first pillar 114 and the second pillar 116 may be individual components and separately attached to the first circular body 112. Similarly, the third pillar 124 and the fourth pillar 126 of the second sleeve 120 are attached to the second circular body 122 such that they are diametrically opposite to each other. Further, the third pillar 124 and the fourth pillar 126 are integrally formed with the second circular body 122. Alternatively, the third pillar 124 and the fourth pillar 126 may be individual components and separately attached to the second circular body 122. The first pillar 114, the second pillar 116, the third pillar 124 and the fourth pillar 126 are collectively referred to as 'the pillars 148' and individually referred to as 'the pillar 148' unless otherwise specifically mentioned. In a nonlimiting example, construction and dimensional specifications of the first sleeve 110 and the second sleeve 120 are identical and they are positioned 90 degrees apart with respect to a central axis 'L' of the flexure bearing 100 to couple each other with the help of the plurality of compression springs 130. The flexure bearing 100 further includes a plurality of blind holes 150 defined in the first pillar 114, the second pillar 116, the third pillar 124 and the fourth pillar 126 to engage with the plurality of compression springs 130. The first sleeve 110 and the second sleeve 120 are coupled in such a way that a gap 160 is defined therebetween to provide rotational movement to the first sleeve 110 and the second sleeve 120 with respect to each other.

Figure 2A:
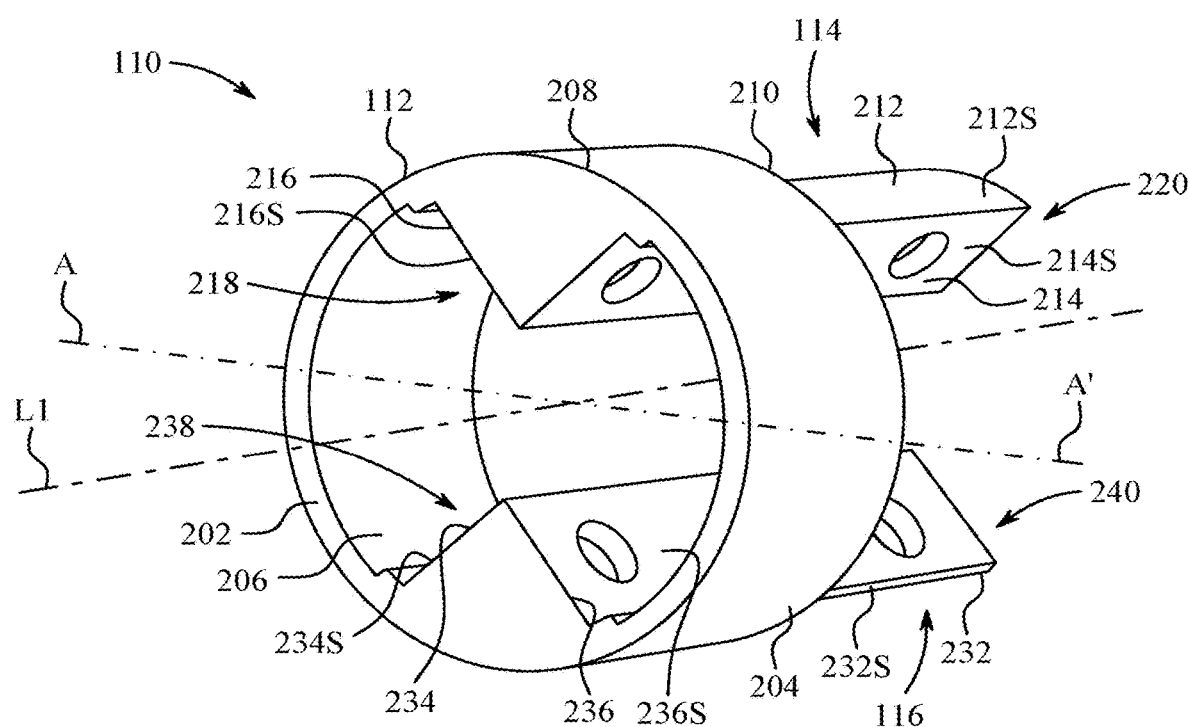
FIG. 2A is a perspective view of a first sleeve of the flexure bearing, according to certain embodiments.

Referring to FIG. 2A, a perspective view of the first sleeve 110 is illustrated. The first sleeve 110 includes the first circular body 112 having a wall 202 defining an outer surface 204 and an inner surface 206. The first circular body 112 has an outer diameter defined by the outer surface 204 of the wall 202. In an example, the outer diameter of the first circular body 112 may be 110 millimeters (mm). The wall 202 has a thickness defined radially between the outer surface 204 and the inner surface 206 thereof. In an example, the thickness of the wall 202 may be 7 mm. Further, the first circular body 112 has a width defined longitudinally between a first edge 208 and a second edge 210 thereof. In an example, the width of the first circular body 112 may be 54 mm. The first pillar 114 is an elongated body having a length equal to or less than twice the width of the first circular body 112. The first pillar 114 includes three sides such as a first side 212, a second side 214, and a third side 216. Further, the first pillar 114 includes a first end 218 attached to an inside wall, otherwise referred to as the inner surface 206 of the wall 202, of the first sleeve 110 and a second end 220 projects outwardly from the first sleeve 110 parallel to an axis 'L1' of the first sleeve 110.

Figure 2B:
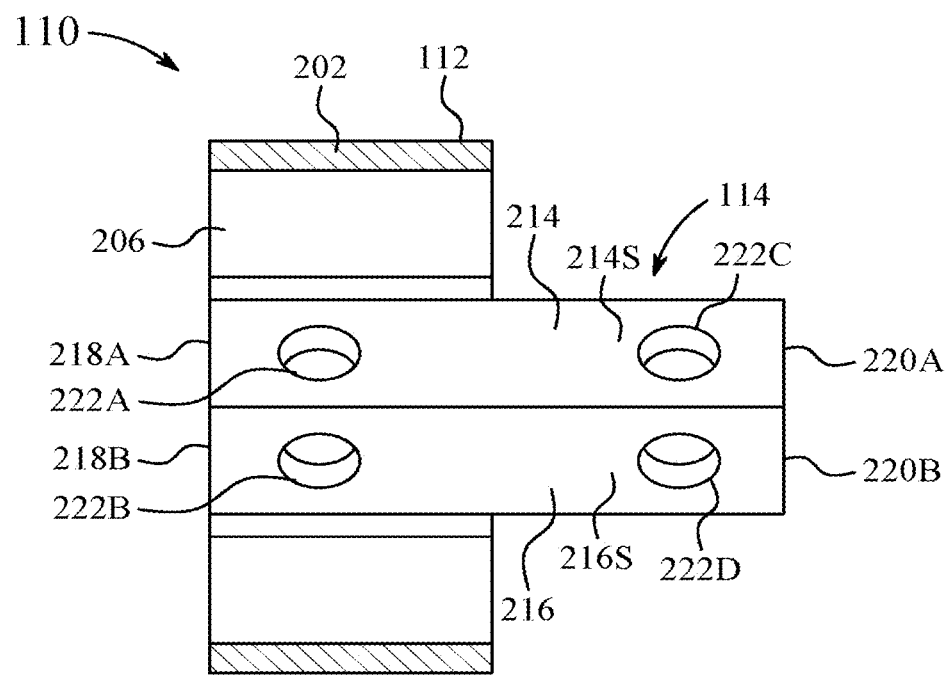
FIG. 2B is a cross-sectional view taken along a line A-A' of the first sleeve of FIG. 2A showing a first pillar thereof, according to certain embodiments.

Referring to FIG. 2B, a cross-sectional view taken along a line A-A' of the first sleeve 110 is illustrated to show the first pillar 114. Referring to FIGS. 2A-2B, the first side 212 of the first pillar 114 is shaped to confirm to a sector of an inner surface of the sleeve 140, particularly, the inner surface 206 of the wall 202 of the first circular body 112 of the first sleeve 110. The first side 212 of the first pillar 114 has a curved surface 212S defined by a radius of curvature equal to a radius of curvature of the inner surface 206 of the wall 202 of the first circular body 112. The second side 214 of the first pillar 114 has a first flat surface 214S and the third side 216 of the first pillar 114 has a second flat surface 216S perpendicular to an edge of the first flat surface 214S. The curved surface 212S, the first flat surface 214S and the second flat surface 216S together define an outer surface of the first pillar 114.

As shown in FIG. 2B, the first pillar 114 has a first blind hole 222A near a first end 218A of the second side 214, a second blind hole 222B near a first end 218B of the third side 216, a third blind hole 222C near a second end 220A of the second side 214, and a fourth blind hole 222D near a second end 220B of the third side 216. Particularly, the first blind hole 222A and the third blind hole 222C are defined in the first flat surface 214S, and the second blind hole 222B and the fourth blind hole 222D are defined in the second flat surface 216S. The first blind hole 222A, the second blind hole 222B, the third blind hole 222C, and the fourth blind hole 222D are collectively referred to as 'the blind holes 150' and individually referred to as 'the blind hole 150' unless otherwise specifically mentioned. Each blind hole 150 has a circular cross section and has a diameter. In an example, the diameter of each blind hole 150 may be 14 mm. The first end 218A of the second side 214 and the first end 218B of the third side 216 are collectively or individually referred to as 'the first end(s) 218' of the first pillar 114 and the second end 220A of the second side 214 and the second end 220B of the third side 216 are collectively or individually referred to as 'the second end(s) 220' of the first pillar 114 unless otherwise specifically mentioned. Each of the first blind hole 222A and the second blind hole 222B is defined at an offset distance from an edge of the first end 218A of the second side 214 and an edge from the first end 218B of the third side 216, respectively. Similarly, each of the third blind hole 222C and the fourth blind hole 222D is defined at an offset distance from an edge of the second end 220A of the second side 214 and an edge from the second end 220B of the third side 216, respectively. The offset distance may be defined as a distance between the edge of the first end 218 of the first pillar 114 and a center of the blind hole 150. In an example, the offset distance may be 20 mm.

Figure 2C:
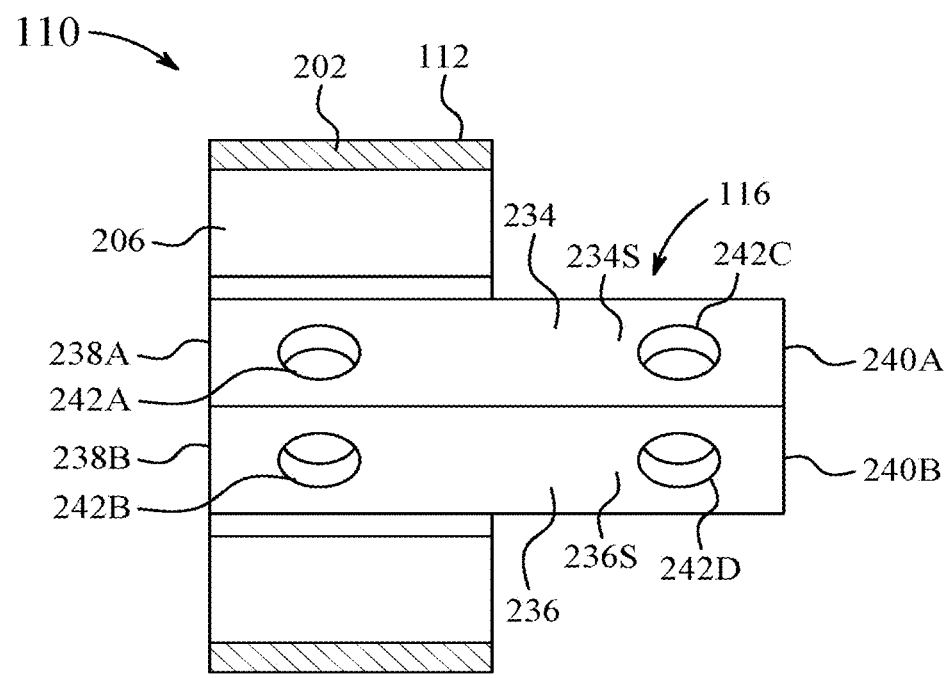
FIG. 2C is a cross-sectional view taken along the line A-A' of the first sleeve of FIG. 2A showing a second pillar thereof, according to certain embodiments.

Referring to FIG. 2C, a cross-sectional view taken along the line A-A' of the first sleeve 110 is illustrated to show the second pillar 116. Referring to FIGS. 2A and 2C, the second pillar 116 is an elongated body having a length equal to the length of the first pillar 114 and includes three sides such as a first side 232, a second side 234, and a third side 236. Further, the second pillar 116 includes a first end 238 attached to the inside wall, otherwise referred to as the inner surface 206 of the wall 202, of the first sleeve 110 diametrically opposite to the first pillar 114 and a second end 240 projects outwardly from the first sleeve 110 parallel to the axis 'L1' and the first pillar 114 of the first sleeve 110. The first side 232 of the second pillar 116 is shaped to confirm to a sector of the inner surface of the sleeve 140, particularly, the inner surface 206 of the wall 202 of the first circular body 112. The first side 232 of the second pillar 116 has a curved surface 232S defined by a radius of curvature equal to the radius of curvature of the inner surface 206 of the wall 202 of the first circular body 112. The second side 234 of the second pillar 116 has a first flat surface 234S and the third side 236 of the second pillar 116 has a second flat surface 236S perpendicular to an edge of the first flat surface 234S. The curved surface 232S, the first flat surface 234S and the second flat surface 236S together define an outer surface of the second pillar 116.

As shown in FIG. 2C, the second pillar 116 has a first blind hole 242A near a first end 238A of the second side 234, a second blind hole 242B near a first end 238B of the third side 236, a third blind hole 242C near a second end 240A of the second side 234, and a fourth blind hole 242D near a second end 240B of the third side 236. Particularly, the first blind hole 242A and the third blind hole 242C are defined in the first flat surface 234S, and the second blind hole 242B and the fourth blind hole 242D are defined in the second flat surface 236S of the second pillar 116. The first blind hole 242A, the second blind hole 242B, the third blind hole 242C, and the fourth blind hole 242D are collectively referred to as 'the blind holes 150' and individually referred to as 'the blind hole 150' unless otherwise specifically mentioned. The first end 238A of the second side 234 and the first end 238B of the third side 236 are collectively or individually referred to as 'the first end 238' of the second pillar 116 and the second end 240A of the second side 234 and the second end 240B of the third side 236 are collectively or individually referred to as 'the second side 240' of the second pillar 116 unless otherwise specifically mentioned. The dimensional specifications of the blind holes 150 and the offset distance of the second pillar 116 are identical to that of the first pillar 114.

Figure 3A:
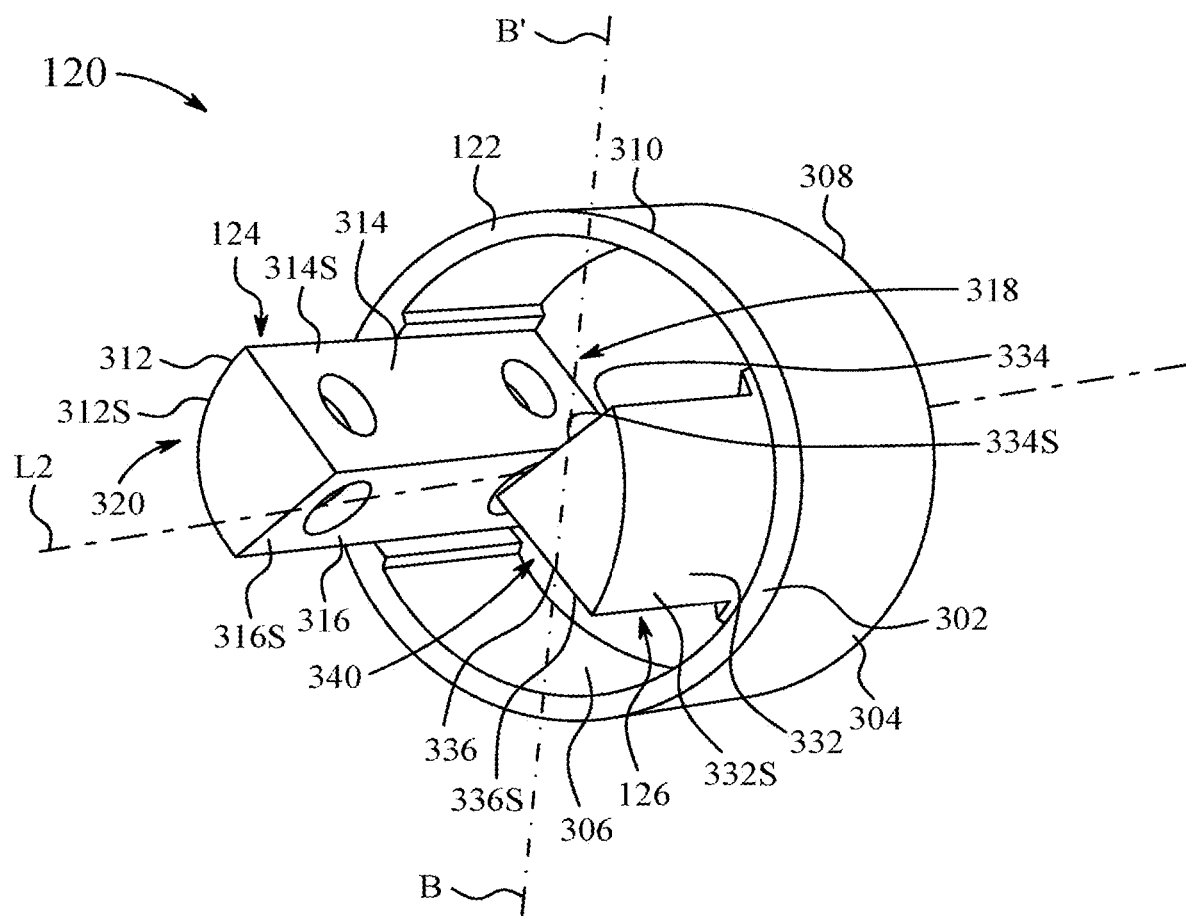
FIG. 3A is a perspective view of a second sleeve of the flexure bearing, according to certain embodiments.

Referring to FIG. 3A, a perspective view of the second sleeve 120 is illustrated. The second sleeve 120 includes the second circular body 122 having a wall 302 defining an outer surface 304 and an inner surface 306. The second circular body 122 has an outer diameter defined by the outer surface 304, a thickness defined radially between the outer surface 304 and the inner surface 306, and a width defined longitudinally between a first edge 308 and a second edge 310, which are equal to that of the first circular body 112. The third pillar 124 is an elongated body having a length equal to or less than twice the width of the second circular body 122 and includes three sides such as a first side 312, a second side 314, and a third side 316. Further, the third pillar 124 includes a first end 318 attached to an inside wall, otherwise referred to as the inner surface 306 of the wall 302, of the second sleeve 120 and a second end 320 projects outwardly from the second sleeve 120 parallel to an axis 12' of the second sleeve 120.

Figure 3B:
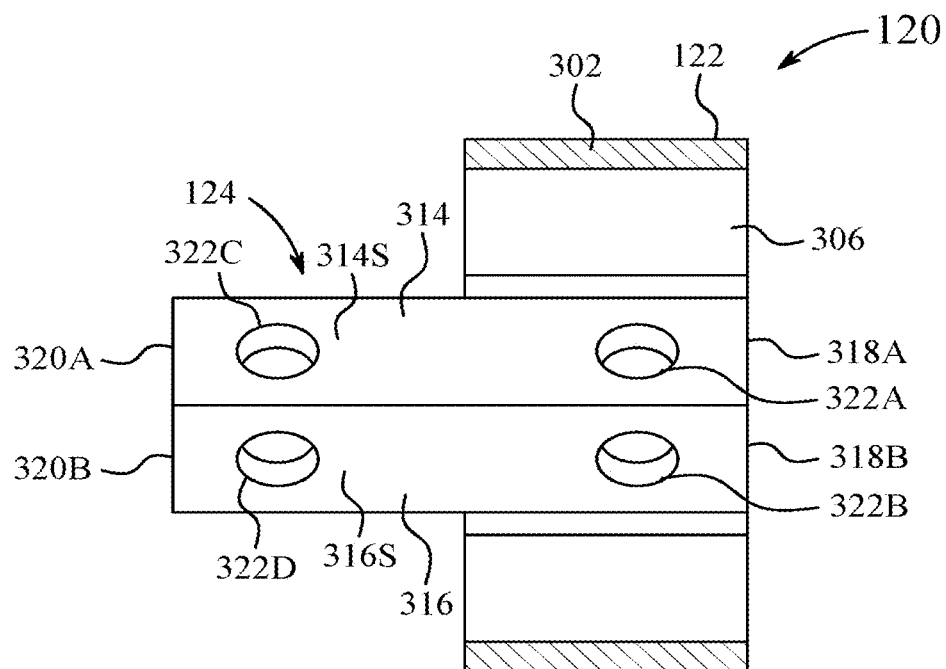
FIG. 3B is a cross-sectional view taken along a line B-B' of the second sleeve of FIG. 3A showing a first pillar thereof, according to certain embodiments.

Referring to FIG. 3B, a cross-sectional view taken along a line B-B' of the second sleeve 120 is illustrated to show the third pillar 124. Referring to FIGS. 3A-3B, the first side 312 of the third pillar 124 is shaped to confirm to a sector of an inner surface of the sleeve 140, or the inner surface 306 of the wall 302 of the second circular body 122. Particularly, the first side 312 of the third pillar 124 has a curved surface 312S defined by a radius of curvature equal to a radius of curvature of the inner surface 306 of the wall 302 of the second circular body 122. The second side 314 of the third pillar 124 has a first flat surface 314S and the third side 316 of the third pillar 124 has a second flat surface 316S perpendicular to an edge of the first flat surface 314S. The curved surface 312S, the first flat surface 314S and the second flat surface 316S together define an outer surface of the third pillar 124.

As shown in FIG. 3B, the third pillar 124 has a first blind hole 322A near a first end 318A of the second side 314, a second blind hole 322B near a first end 318B of the third side 316, a third blind hole 322C near a second end 320A of the second side 314, and a fourth blind hole 322D near a second end 320B of the third side 316. Particularly, the first blind hole 322A and the third blind hole 322C are defined in the first flat surface 314S, and the second blind hole 322B and the fourth blind hole 322D are defined in the second flat surface 316S. The first blind hole 322A, the second blind hole 322B, the third blind hole 322C, and the fourth blind hole 322D are collectively referred to as 'the blind holes 150' and individually referred to as 'the blind hole 150' unless otherwise specifically mentioned. The first end 318A of the second side 314 and the first end 318B of the third side 316 are collectively referred to as 'the first end(s) 318' of the third pillar 124 and the second end 320A of the second side 314 and the second end 320B of the third side 316 are collectively referred to as 'the second end(s) 320' of the third pillar 124 unless otherwise specifically mentioned.

Figure 3C:
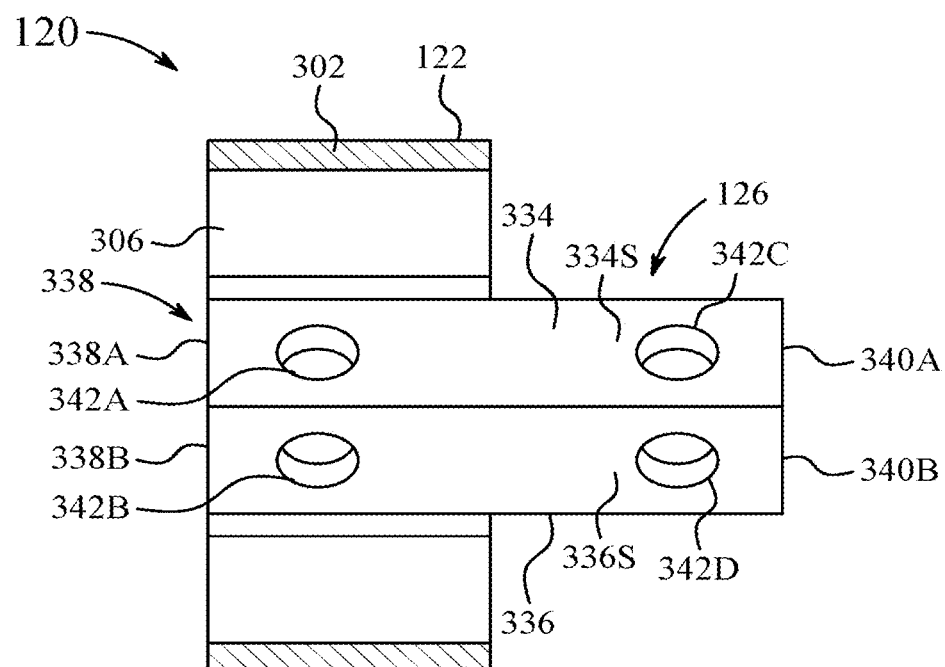
FIG. 3C is a cross-sectional view taken along the line B-B' of the second sleeve of FIG. 3A showing a second pillar thereof, according to certain embodiments.

Referring to FIG. 3C, a cross-sectional view taken along the line B-B' of the second sleeve 120 is illustrated to show the fourth pillar 126. Referring to FIGS. 3A and 3C, the fourth pillar 126 is an elongated body having a length equal to the length of the third pillar 124 and includes three sides such as a first side 332, a second side 334, and a third side 336. Further, the fourth pillar 126 includes a first end 338 attached to the inside wall, otherwise referred to as the inner surface 306 of the wall 302, of the second sleeve 120 diametrically opposite to the third pillar 124 and a second end 340 projects outwardly from the second sleeve 120 parallel to the axis 'L2' and the third pillar 124 of the second sleeve 120. The first side 332 of the fourth pillar 126 is shaped to confirm to a sector of the inner surface of the sleeve 140, or the inner surface 306 of the wall 302 of the second circular body 122. Particularly, the first side 332 of the second pillar 126 has a curved surface 332S defined by a radius of curvature equal to the radius of curvature of the inner surface 306 of the wall 302 of the second circular body 122. The second side 334 of the fourth pillar 126 has a first flat surface 334S and the third side 336 of the fourth pillar 126 has a second flat surface 336S perpendicular to an edge of the first flat surface 334S. The curved surface 332S, the first flat surface 334S and the second flat surface 336S together define an outer surface of the fourth pillar 126.

As shown in FIG. 3C, the fourth pillar 126 has a first blind hole 342A near a first end 338A of the second side 334, a second blind hole 342B near a first end 338B of the third side 336, a third blind hole 342C near a second end 340A of the second side 334, and a fourth blind hole 342D near a second end 340B of the third side 336. Particularly, the first blind hole 342A and the third blind hole 342C are defined in the first flat surface 334S, and the second blind hole 342B and the fourth blind hole 342D are defined in the second flat surface 336S. The first blind hole 342A, the second blind hole 342B, the third blind hole 342C, and the fourth blind hole 342D are collectively referred to as 'the blind holes 150' and individually referred to as 'the blind hole 150' unless otherwise specifically mentioned. The first end 338A of the second side 334 and the first end 338B of the third side 336 are collectively referred to as 'the first end(s) 338' of the fourth pillar 126 and the second end 340A of the second side 334 and the second end 340B of the third side 336 are collectively referred to as 'the second end(s) 340' of the fourth pillar 126 unless otherwise specifically mentioned.

Figure 4:
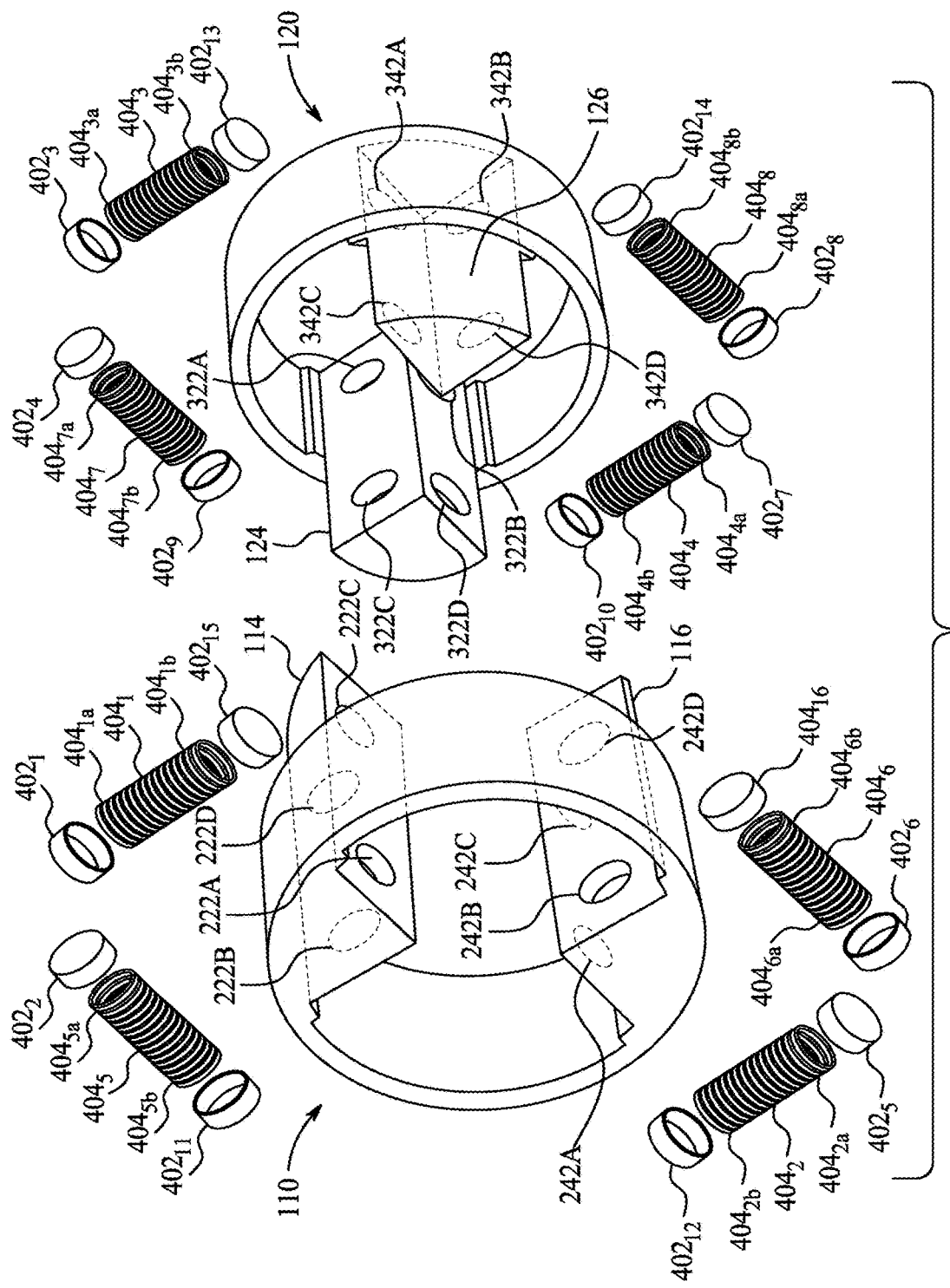
FIG. 4 is an exploded view of the flexure bearing, according to certain embodiments.

Referring to FIG. 4, an exploded view of the flexure bearing 100 is illustrated. The flexure bearing 100 includes a plurality of end caps 402 configured to engage with the plurality of blind holes 150. The plurality of end caps 402 includes a first cap $402_1$, a second cap $402_2$, a third cap $402_3$, and a fourth cap $402_4$ configured to engage with the first blind hole 222A, the second blind hole 222B, the third blind hole 222C, and the fourth blind hole 222D, respectively, of the first pillar 114 of the first sleeve 110. The plurality of end caps 420 further includes a fifth cap $402_5$, a sixth cap $402_6$, a seventh cap $402_7$, and an eight cap $402_8$ configured to engage with the first blind hole 242A, the second blind hole 242B, the third blind hole 242C, and the fourth blind hole 242D, respectively, of the second pillar 116 of the first sleeve 110. The plurality of end caps 402 further includes a ninth cap $402_9$, a tenth cap $402_{10}$, an eleventh cap $402_{11}$, and a twelfth cap $402_{12}$ configured to engage with the first blind hole 322A, the second blind hole 322B, the third blind hole 322C, and the fourth blind hole 322D, respectively, of the third pillar 124 of the second sleeve 120. The plurality of end caps 402 further includes a thirteenth cap $402_{13}$, a fourteenth cap $402_{14}$, a fifteenth cap $402_{15}$, and a sixteenth cap $402_{16}$ configured to engage with the first blind hole 342A, the second blind hole 342B, the third blind hole 342C, and the fourth blind hole 342D, respectively, of the fourth pillar 126 of the second sleeve 120. The plurality of end caps 402 may be individually referred to as 'the end cap 402' unless otherwise specifically mentioned.

The end cap 402 is a hollow cylindrical body having a diameter, otherwise referred to as the outer diameter, equal to the diameter of the blind hole 150 such that the end cap 402 is slidably received within the blind hole 150. Further, the end cap 402 has a length equal to a depth of the blind hole 150 such that the end cap 402 is received within the blind hole 150 without leaving any portion thereof projected outside the blind hole 150. The end cap 402 is further configured to engage with an end of each of the compression springs 130. Particularly, the end cap 402 has an inner diameter greater than or equal to an outer diameter of the compression spring 130 such that the end of the compression spring 130 is slidably received within the end cap 402. During an assembly of the flexure bearing 100, in one example, the end cap 402 may be firmly engaged within the blind hole 150 such that the sleeve 140 and the blind hole 150 may be formed as one component. In another example, the end cap 402 may be attached to the ends of the compression spring 130 such that the compression spring 130 and the end caps 402 together may be formed as one component.

The plurality of compression springs 130 includes a first compression spring $404_1$ having a first spring end $404_{1a}$ and a second spring end $404_{1b}$, a second compression spring $404_2$ having a first spring end $404_{2a}$ and a second spring end $404_{2b}$, a third compression spring $404_3$ having a first spring end $404_{3a}$ and a second spring end $404_{3b}$, a fourth compression spring $404_4$ having a first spring end $404_{4a}$ and a second spring end $404_{4b}$, a fifth compression spring $404_5$ having a first spring end $404_{5a}$ and a second spring end $404_{5b}$, a sixth compression spring $404_6$ having a first spring end $404_{6a}$ and a second spring end $404_{6b}$, a seventh compression spring $404_7$ having a first spring end $404_{7a}$ and a second spring end $404_m$, and an eighth compression spring $404_8$ having a first spring end $404_{8a}$ and a second spring end $404_{8b}$, configured to rotatably couple the first sleeve 110 with the second sleeve 120. Each compression spring 130 has the first spring end configured to fit into one of the blind holes 150 of the pillar 148 of the first sleeve 110 and the second spring end configured to fit into a corresponding blind hole 150 of an adjacent pillar 150 of the second sleeve 120 when the second sleeve 120 is interconnected to the first sleeve 110. The plurality of compression springs 130 is individually referred to as 'the compression spring 130' unless otherwise specifically mentioned. The compression spring 130 is alternatively referred to 'the spring 130' and, for example, the first compression spring $404_1$ is alternatively referred to as 'the first spring $404_1$'. The compression spring 130 is a helical compression spring. The compression spring 130 has a length at least three times of the depth of the blind hole 150. Each compression spring 130 includes a first spring end configured to engage with an end cap 402, otherwise referred to as 'the first end cap 402', and a second spring end configured to engage with an end cap 402, otherwise referred to as 'the second end cap 402'.

Figure 5A:
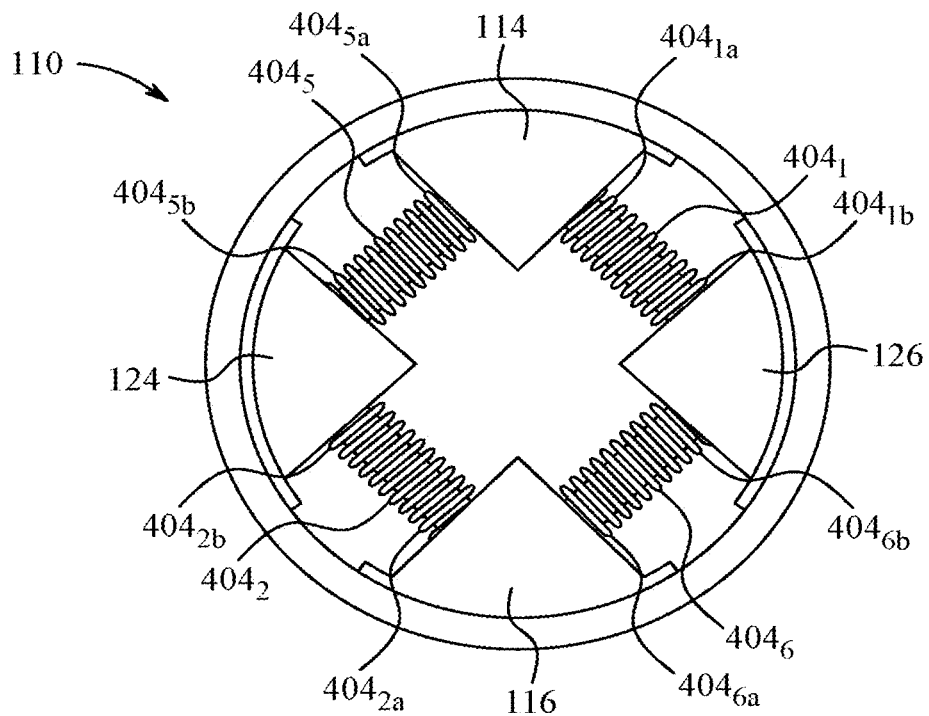
FIG. 5A is a front view of the flexure bearing of FIG. 1, according to certain embodiments.
Figure 5B:
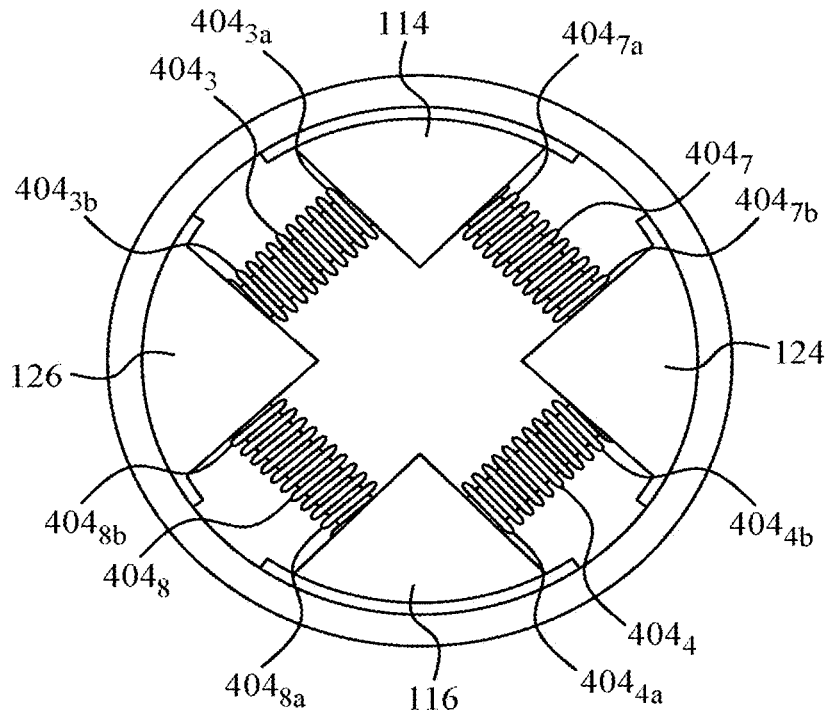
FIG. 5B is a rear view of the flexure bearing of FIG. 1, according to certain embodiments.

Referring to FIGS. 5A and 5B, a front view and a rear view, respectively, of the flexure bearing 100 of FIG. 1 are illustrated. Referring to FIGS. 1 through 5B, during an assembly of the flexure bearing 100, the first sleeve 110 and the second sleeve 120 are aligned at an offset angle of 90 degrees with respect to the central axis 'L' of the flexure bearing 100. In a nonlimiting example, the first pillar 114 and the second pillar 116 of the first sleeve 110 are aligned vertically and the third pillar 124 and the fourth pillar 126 of the second sleeve 120 are positioned horizontally such that the first and the second sleeves 110, 120 are aligned at the offset angle of 90 degrees. Furter, the first pillar 114 and the second pillar 116 of the first sleeve 110 are inserted between the third pillar 124 and the fourth pillar 126 of the second sleeve 120. The first sleeve 110 and the second sleeve 120 are engaged in such a way that the gap 160 is defined between the second edge 210 of the first sleeve 110 and the second edge 310 of the second sleeve 120. In an example, the gap 160 between the first sleeve 110 and the second sleeve 120 may be 2 mm. When the first sleeve 110 and the second sleeve 120 are assembled with the gap 160 therebetween, the blind holes 150 of the first pillar 114 and the second pillar 116 are aligned with corresponding blind holes 150 of the third pillar 124 and the fourth pillar 126. Further, the first spring end of each compression spring 130 is inserted into the blind holes 150 of the first and second pillars 114, 116 of the first sleeve 110 and the second spring end of each compression spring 130 is inserted into the corresponding blind holes 150 of the third and fourth pillars 124, 126 of the second sleeve 120. The end caps 402 may be inserted within the blind holes 150 of the sleeves 140 during the manufacturing thereof.

Figure 6:
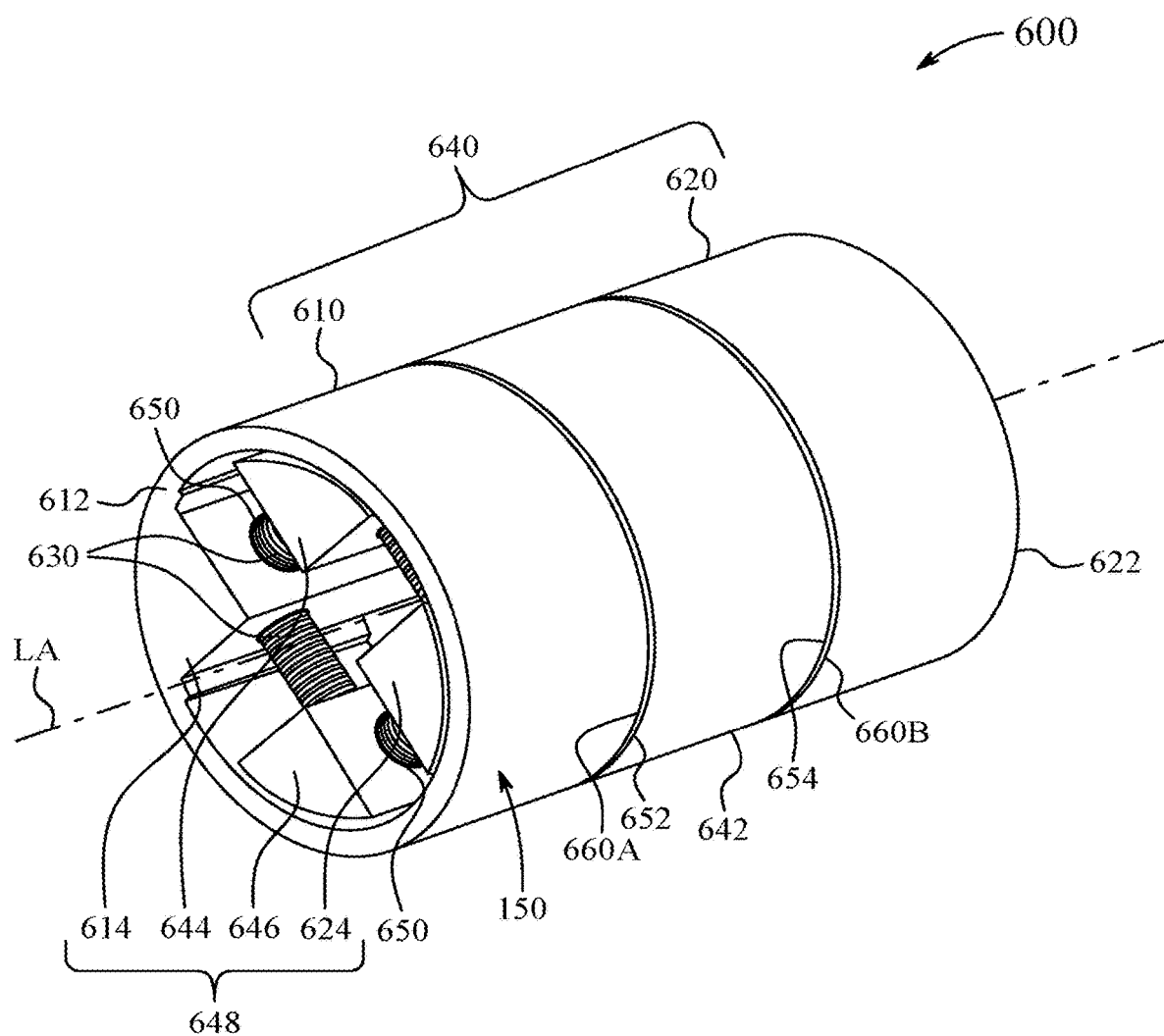
FIG. 6 is a perspective view of a double-ended flexure bearing, according to certain embodiments.

Referring to FIG. 6, a perspective view of a double-ended flexure bearing 600 is illustrated. The double-ended flexure bearing 600 includes a first outer sleeve 610, alternatively referred to as 'the first sleeve 610', and a second outer sleeve 620, alternatively referred to as 'the second sleeve 620' coupled to each other with a plurality of compression springs 630. The first outer sleeve 610 includes a first circular body 612 having a first pillar 614 attached thereto and the second outer sleeve 620 includes a second circular body 622 having a second pillar 624 attached thereto. Further, the first pillar 614 of the first outer sleeve 610 and the second pillar 624 of the second outer sleeve 620 are integrally formed with the first circular body 612 and the second circular body 622, respectively. Alternatively, the first pillar 614 and the second pillar 624 may be individual components and separately attached to the first circular body 612 and the second circular body 622, respectively. The first outer sleeve 610 and the second outer sleeve 620 are collectively referred to as 'the sleeves 640' and individually referred to as 'the sleeve 640' unless otherwise specifically mentioned. In a nonlimiting example, construction and dimensional specifications of the first outer sleeve 610 and the second outer sleeve 620 are identical and they are positioned 180 degrees apart with respect to a central axis 'LA' of the double-ended flexure bearing 600 to couple each other with the help of the plurality of compression springs 630.

The double-ended flexure bearing 600 further includes a central rotor ring 642 configured to engage with and connect to the first outer sleeve 610 and the second outer sleeve 620. The central rotor ring 642 includes a third pillar 644 and a fourth pillar 646 configured to engage with the first pillar 614 of the first outer sleeve 610 and the second pillar 624 of the second outer sleeve 620 using the plurality of compression springs 630. Particularly, the central rotor ring 642 is disposed between the first outer sleeve 610 and the second outer sleeve 620 and coaxially aligned with the first outer sleeve 610 and the second outer sleeve 620 to engage therewith using the plurality of compression springs 630. The first pillar 614, the second pillar 624, the third pillar 644, and the fourth pillar 646 are collectively referred to as 'the pillars 648' and individually referred to as 'the pillar 648' unless otherwise specifically mentioned. Each of the first pillar 614, the second pillar 624, the third pillar 644 and the fourth pillar 646 includes a plurality of blind holes 650, which is individually referred to as 'the blind hole 650'. The plurality of compression springs 630 is configured to connect each of the plurality of blind holes 650 of each pillar 648 to a blind hole 650 of an adjacent pillar 648, such that the first outer sleeve 610 abuts a first edge 652 of the central rotor ring 642 and the second outer sleeve 620 abuts a second edge 654 of the central rotor ring 642. The first outer sleeve 610, the second outer sleeve 620, and the central rotor ring 642 are coupled in such a way that a first gap 660A is defined between the first outer sleeve 610 and the central rotor ring 642 and a second gap 660B is defined between the second outer sleeve 620 and the central rotor ring 642 to provide rotational movement with respect to each other.

Figure 7A:
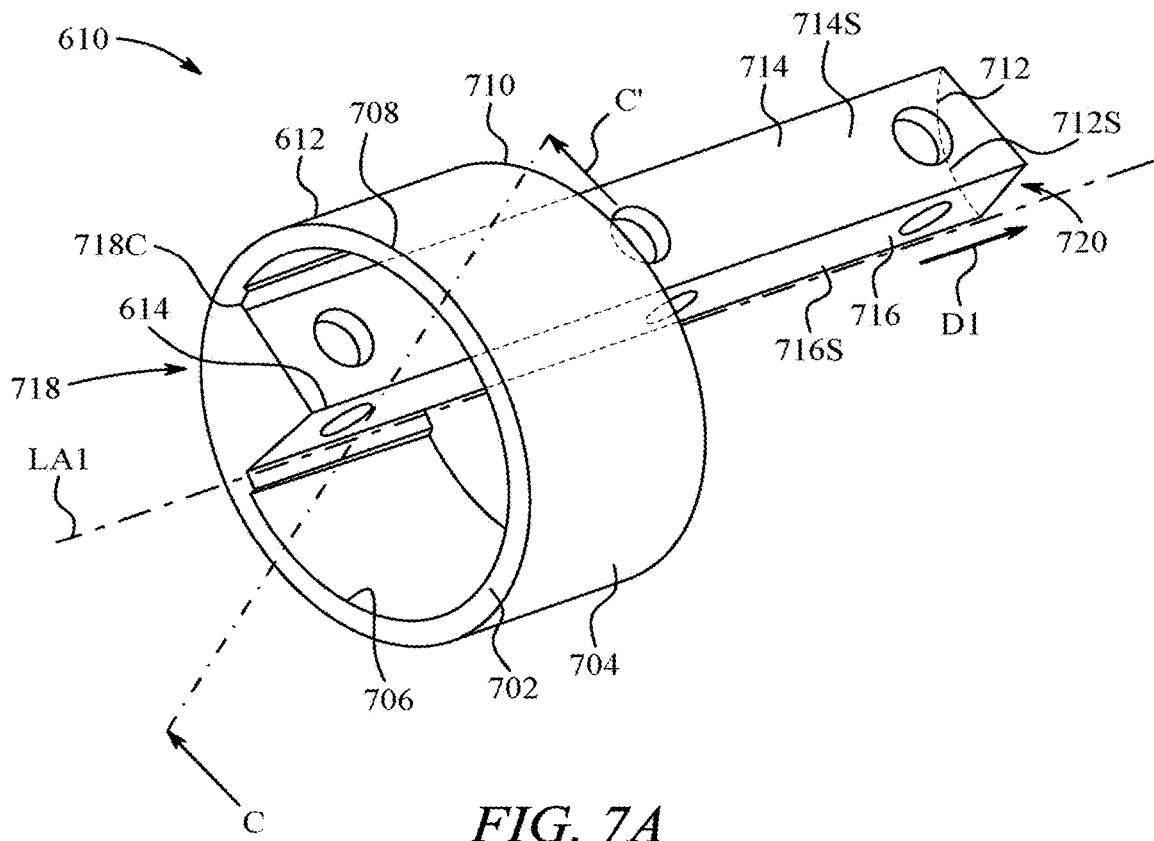
FIG. 7A is a perspective view of a first outer sleeve of the double-ended flexure bearing of FIG. 6, according to certain embodiments.

Referring to FIG. 7A, a perspective view of the first outer sleeve 610 is illustrated. The first outer sleeve 610 includes the first circular body 612 having a wall 702 defining an outer surface 704 and an inner surface 706. The first circular body 612 has an outer diameter defined by the outer surface 704 of the wall 702, a thickness defined radially between the outer surface 704 and the inner surface 706, and a width defined longitudinally between a first edge 708 and a second edge 710. The first pillar 614 is an elongated body that projects outwardly from the first outer sleeve 610 in a first direction 'D1' and has a length equal to or less than thrice the width of the first circular body 612. The first pillar 614 includes three sides such as a first side 712, a second side 714, and a third side 716. Further, the first pillar 614 includes a first end 718 attached to a first inside wall, otherwise referred to as the inner surface 706 of the wall 702, of the first outer sleeve 610 and a second end 720 projects outwardly from the first outer sleeve 610 parallel to an axis 'LA1' of the first outer sleeve 610. Particularly, a first end 718C of the first side 712 of the first pillar 614 is attached to the first inside wall of the first outer sleeve 610.

Figure 7B:
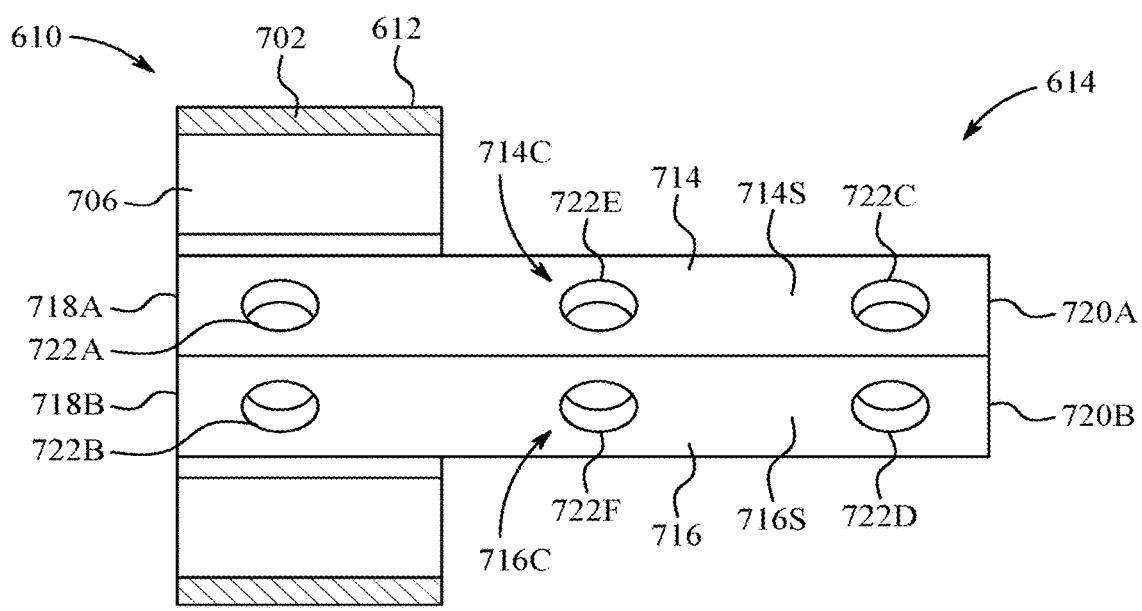
FIG. 7B is a cross-sectional view taken along a line C-C' of the first outer sleeve of FIG. 7A showing a first pillar thereof, according to certain embodiments.

Referring to FIG. 7B, a cross-sectional view taken along a line C-C' of the first outer sleeve 610 is illustrated to show the first pillar 614. Referring to FIGS. 7A-7B, the first side 712 of the first pillar 614 is shaped to confirm to the first inside wall of the first outer sleeve 610. Particularly, the first side 712 of the first pillar 614 is shaped to confirm to a first sector of an inner surface, which is otherwise referred to as the inner surface 706 of the wall 702 of the first circular body 612, of the first outer sleeve 610. The first side 712 of the first pillar 614 has a curved surface 712S defined by a radius of curvature equal to a radius of curvature of the inner surface 706 of the wall 702 of the first circular body 612. The second side 714 of the first pillar 614 has a first flat surface 714S and the third side 716 of the first pillar 614 has a second flat surface 716S perpendicular to an edge of the first flat surface 714S. The curved surface 712S, the first flat surface 714S and the second flat surface 716S together define an outer surface of the first pillar 614.

As shown in FIG. 7B, the first pillar 614 has a first blind hole 722A near a first end 718A of the second side 714, a second blind hole 722B near a first end 718B of the third side 716, a third blind hole 722C near a second end 720A of the second side 714, and a fourth blind hole 722D near a second end 720B of the third side 716, a fifth blind hole 722E at a center 714C of the second side 714 and a sixth blind hole 722F at a center 716C of the third side 716. Particularly, the first blind hole 722A, the third blind hole 722C and the fifth blind hole 722E are defined in the first flat surface 714S, and the second blind hole 722B, the fourth blind hole 722D and the sixth blind hole 722F are defined in the second flat surface 716S. The first blind hole 722A, the second blind hole 722B, the third blind hole 722C, the fourth blind hole 722D, the fifth blind hole 722E and the sixth blind hole 722F are collectively referred to as 'the blind holes 650' and individually referred to as 'the blind hole 650' unless otherwise specifically mentioned. The first end 718A of the second side 714, the first end 718B of the third side 716 and the first end 718C of the first side 712 are collectively or individually referred to as 'the first end(s) 718' of the first pillar 614 and the second end 720A of the second side 714 and the second end 720B of the third side 716 are collectively or individually referred to as 'the second end(s) 720' of the first pillar 614 unless otherwise specifically mentioned.

Figure 8A:
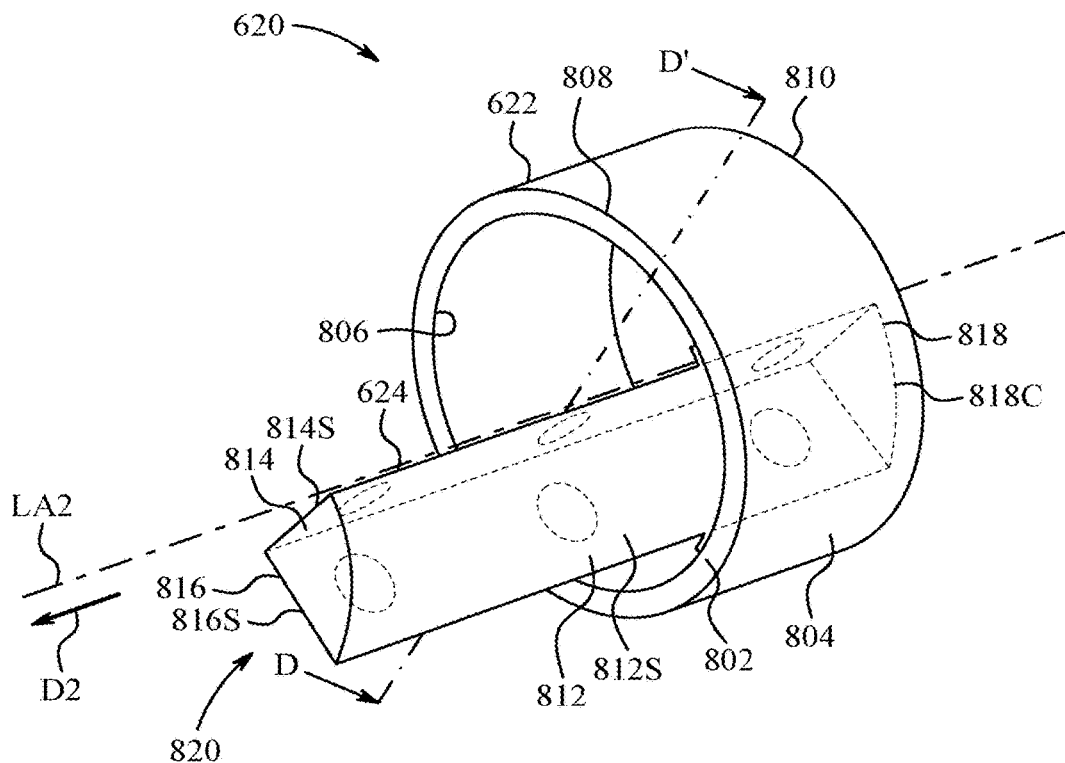
FIG. 8A is a perspective view of a second outer sleeve of the double-ended flexure bearing of FIG. 6, according to certain embodiments.

Referring to FIG. 8A, a perspective view of the second outer sleeve 620 is illustrated. The second outer sleeve 620 includes the second circular body 622 having a wall 802 defining an outer surface 804 and an inner surface 806. The second circular body 622 has an outer diameter defined by the outer surface 804 of the wall 802, a thickness defined radially between the outer surface 804 and the inner surface 806, and a width defined longitudinally between a first edge 808 and a second edge 810. The second pillar 624 is an elongated body that projects outwardly from the second outer sleeve 620 in a second direction 'D2' and has a length equal to or less than thrice the width of the second circular body 622. The second pillar 624 includes three sides such as a first side 812, a second side 814, and a third side 816. Further, the second pillar 624 includes a first end 818 attached to a second inside wall, otherwise referred to as the inner surface 806 of the wall 802, of the second outer sleeve 620 and a second end 820 projects outwardly from the second outer sleeve 620 parallel to an axis 'LA2' of the second outer sleeve 620. Particularly, a first end 818C of the first side 812 of the second pillar 624 is attached to the second inside wall of the second outer sleeve 620.

Figure 8B:
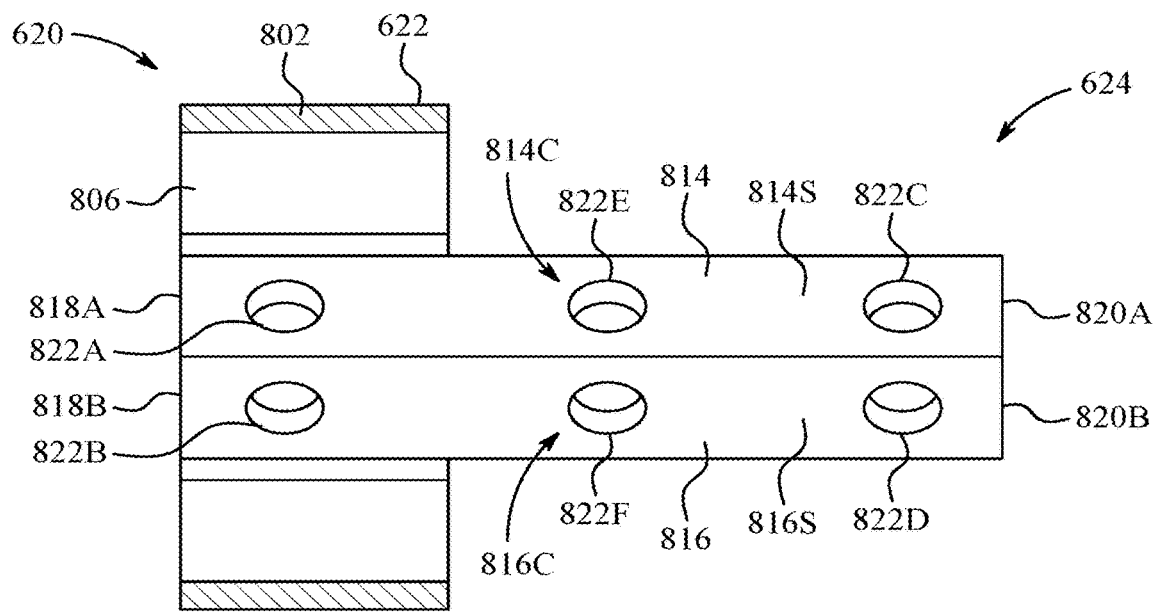
FIG. 8B is a cross-sectional view taken along a line D-D' of the second outer sleeve of FIG. 8A showing a second pillar thereof, according to certain embodiments.

Referring to FIG. 8B, a cross-sectional view taken along a line D-D' of the second outer sleeve 620 is illustrated to show the second pillar 624. Referring to FIGS. 8A-8B, the first side 812 of the second pillar 624 is shaped to confirm to the second inside wall of the second outer sleeve 620. Particularly, the first side 812 of the second pillar 624 is shaped to confirm to a second sector of an inner surface, which is otherwise referred to as the inner surface 806 of the wall 802 of the second circular body 622, of the second outer sleeve 620. The first side 812 of the second pillar 624 has a curved surface 812S defined by a radius of curvature equal to a radius of curvature of the inner surface 806 of the wall 802 of the second circular body 622. The second side 814 of the second pillar 624 has a third flat surface 814S, alternatively referred to as 'the first flat surface 814S' and the third side 816 of the second pillar 624 has a fourth flat surface 816S, alternatively referred to as 'the second flat surface 816S', perpendicular to an edge of the third flat surface 814S. The curved surface 812S, the third flat surface 814S and the fourth flat surface 816S together define an outer surface of the second pillar 624.

As shown in FIG. 8B, the second pillar 624 has a first blind hole 822A near a first end 818A of the second side 814, a second blind hole 822B near a first end 818B of the third side 816, a third blind hole 822C near a second end 820A of the second side 814, and a fourth blind hole 822D near a second end 820B of the third side 816, a fifth blind hole 822E at a center 814C of the second side 814 and a sixth blind hole 822F at a center 816C of the third side 816. Particularly, the first blind hole 822A, the third blind hole 822C and the fifth blind hole 822E are defined in the third flat surface 814S, and the second blind hole 822B, the fourth blind hole 822D and the sixth blind hole 822F are defined in the fourth flat surface 816S. The first blind hole 822A, the second blind hole 822B, the third blind hole 822C, the fourth blind hole 822D, the fifth blind hole 822E and the sixth blind hole 822F are collectively referred to as 'the blind holes 650' and individually referred to as 'the blind hole 650' unless otherwise specifically mentioned. The first end 818A of the second side 814, the first end 818B of the third side 816 and the first end 818C for the first side 812 are collectively or individually referred to as 'the first end(s) 818' of the second pillar 624 and the second end 820A of the second side 814 and the second end 820B of the third side 816 are collectively or individually referred to as 'the second end(s) 820' of the second pillar 624 unless otherwise specifically mentioned.

Figure 9A:
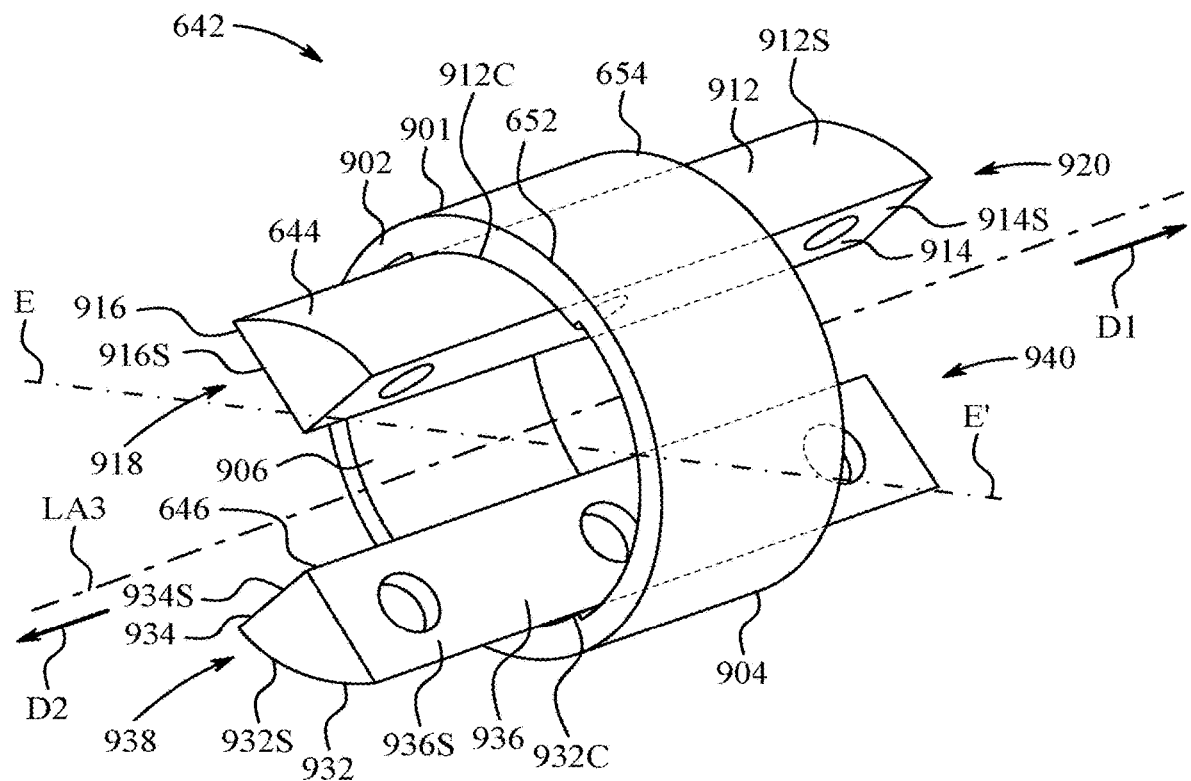
FIG. 9A is a perspective view of a central rotor ring of the double-ended flexure bearing of FIG. 6, according to certain embodiments.

Referring to FIG. 9A, a perspective view of the central rotor ring 642 is illustrated. The central rotor ring 642 includes a third circular body 901 having a wall 902 defining an outer surface 904 and an inner surface 906. The third circular body 901 has an outer diameter defined by the outer surface 904 of the wall 902, a thickness defined radially between the outer surface 904 and the inner surface 906 and a width defined longitudinally between the first edge 652 and the second edge 654. The central rotor ring 642 has an axis 'LA3' concentric with the first outer sleeve 610 and the second outer sleeve 620 at an assembled condition of the double-ended flexure bearing 600. Particularly, the axis 'LA3' of the central rotor ring 642 is coaxial with the axis 'LA1' and the axis 'LA2' of the first outer sleeve 610 and the second outer sleeve 620, respectively. The third pillar 644 is an elongated body that projects outwardly from the central rotor ring 642 in the first direction 'D1' and the in the second direction 'D2' and has a length equal to or less than thrice the width of the first outer sleeve 610 or the second outer sleeve 620. The third pillar 644 includes three sides such as a first side 912, a second side 914 and a third side 916. Further, the third pillar 644 includes a first end 918 projects outwardly from the central rotor ring 642 in the second direction 'D2' and a second end 920 projects outwardly from the central rotor ring 642 in the first direction 'D1' parallel to the axis 'LA3' of the central rotor ring 642. A center 912C of the first side 912 of the third pillar 644 is attached to a first sector of a third inside wall, otherwise referred to as the inner surface 906 of the wall 902, of the central rotor ring 642.

Figure 9B:
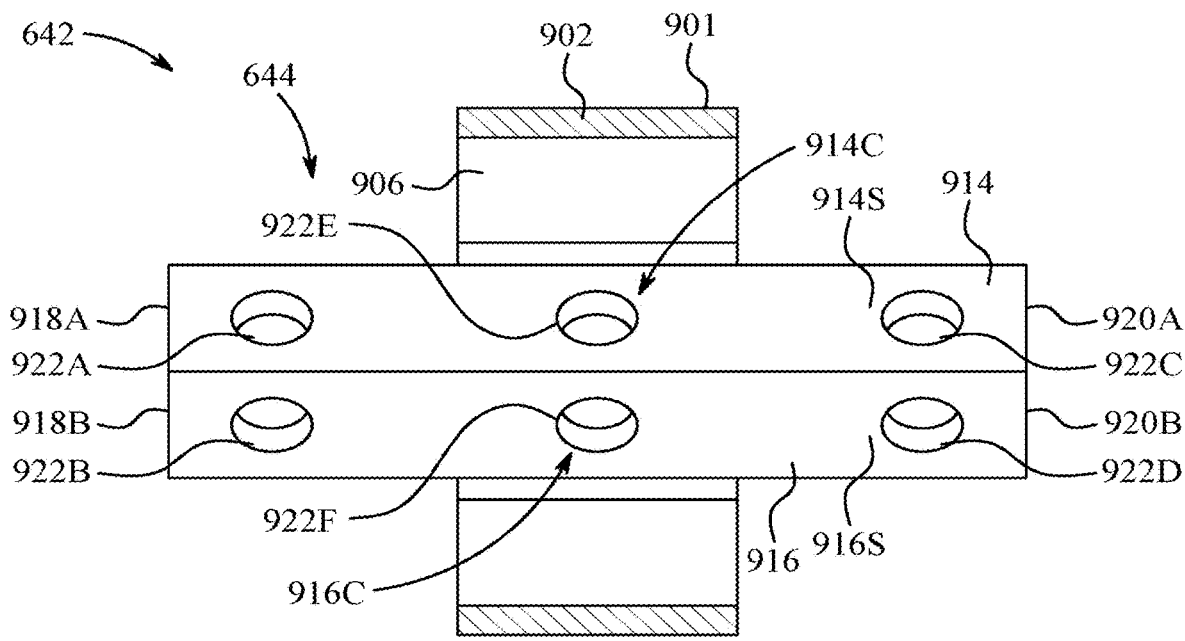
FIG. 9B is a cross-sectional view taken along a line E-E' of the central rotor ring of FIG. 9A showing a third pillar thereof, according to certain embodiments.

Referring to FIG. 9B, a cross-sectional view taken along a line E-E' of the central rotor ring 642 is illustrated to show the third pillar 644. Referring to FIGS. 9A-9B, the first side 912 of the third pillar 644 is shaped to confirm to a third sector of an inner surface, particularly, the inner surface 906 of the wall 902 of the third circular body 901, of the central rotor ring 642. The first side 912 of the third pillar 644 has a curved surface 912S defined by a radius of curvature equal to a radius of curvature of the inner surface 906 of the wall 902 of the third circular body 901. The second side 914 of the third pillar 644 has a fifth flat surface 914S, alternatively referred to as 'the first flat surface 914S', and the third side 916 of the third pillar 644 has a sixth flat surface 916S, alternatively referred to as 'the second flat surface 816S', perpendicular to an edge of the fifth flat surface 914S. The curved surface 912S, the fifth flat surface 914S and the sixth flat surface 916S together define an outer surface of the third pillar 644.

As shown in FIG. 9B, the third pillar 644 has a first blind hole 922A near a first end 918A of the second side 914, a second blind hole 922B near a first end 918B of the third side 916, a third blind hole 922C near a second end 920A of the second side 914, and a fourth blind hole 922D near a second end 920B of the third side 916, a fifth blind hole 922E at a center 914C of the second side 914 and a sixth blind hole 922F at a center 916C of the third side 916. Particularly, the first blind hole 922A, the third blind hole 922C and the fifth blind hole 922E are defined in the fifth flat surface 914S, and the second blind hole 922B, the fourth blind hole 922D and the sixth blind hole 922F are defined in the sixth flat surface 916S. The first blind hole 922A, the second blind hole 922B, the third blind hole 922C, the fourth blind hole 922D, the fifth blind hole 922E and the sixth blind hole 922F are collectively referred to as 'the blind holes 650' and individually referred to as 'the blind hole 650' unless otherwise specifically mentioned. The first end 918A of the second side 914 and the first end 918B of the third side 916 are collectively or individually referred to as 'the first end(s) 918' of the third pillar 644 and the second end 920A of the second side 914 and the second end 920B of the third side 916 are collectively or individually referred to as 'the second end(s) 920' of the third pillar 644 unless otherwise specifically mentioned.

Figure 9C:
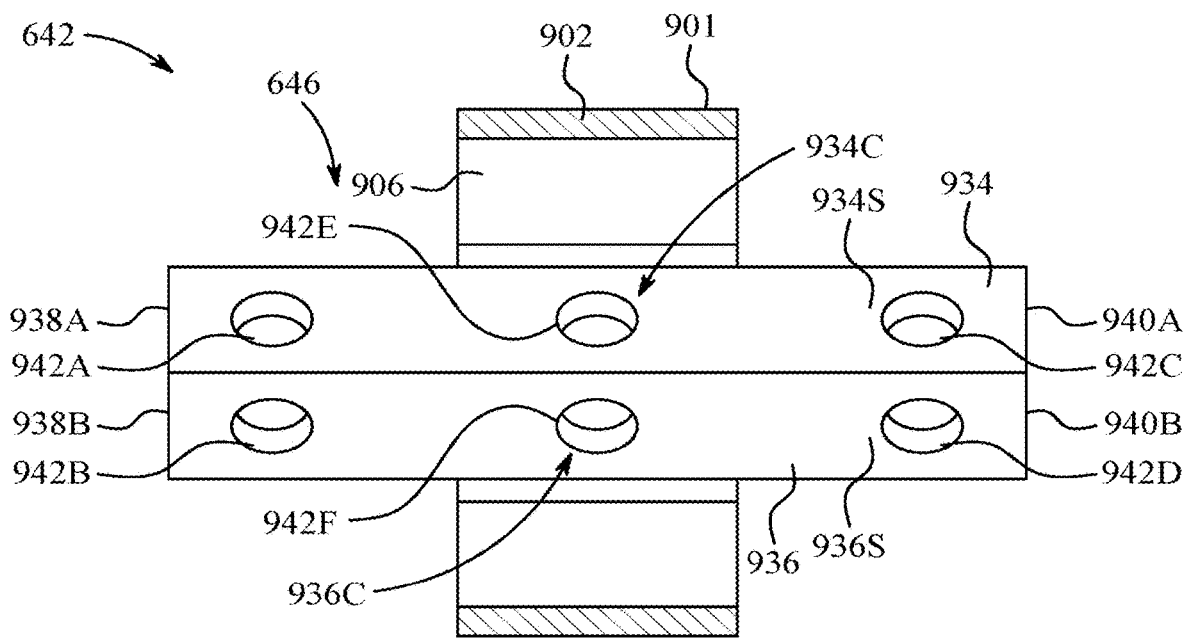
FIG. 9C is a cross-sectional view taken along the line E-E' of the central rotor ring of FIG. 9A showing a fourth pillar thereof, according to certain embodiments.

Referring to FIG. 9C, a cross-sectional view taken along the line E-E' of the central rotor ring 642 is illustrated to show the fourth pillar 646. Referring to FIGS. 9A and 9C, the fourth pillar 646 is an elongated body that projects outwardly from the central rotor ring 642 in the first direction 'D1' and the in the second direction 'D2' and has a length equal to or less than thrice the width of the first outer sleeve 610 or the second outer sleeve 620. The fourth pillar 646 includes three sides such as a first side 932, a second side 934, and a third side 936. Further, the fourth pillar 646 includes a first end 938 projects outwardly from the central rotor ring 642 in the second direction 'D2' and a second end 940 projects outwardly from the central rotor ring 642 in the first direction 'D1' parallel to the axis 'LA3' of the central rotor ring 642. A center 932C of the first side 932 of the fourth pillar 646 is attached to a second sector of the third inside wall, otherwise referred to as the inner surface 906 of the wall 902, of the central rotor ring 642 diametrically opposite to the third pillar 644. Particularly, the first sector is diametrically opposed to the second vector of the central rotor ring 642. The first side 932 of the fourth pillar 646 is shaped to confirm to the fourth sector of an inner surface of the central rotor ring 642, particularly, the inner surface 906 of the wall 902 of the third circular body 901. The first side 932 of the fourth pillar 646 has a curved surface 932S defined by a radius of curvature equal to the radius of curvature of the inner surface 906 of the wall 902 of the third circular body 901. The second side 934 of the fourth pillar 646 has a seventh flat surface 934S, alternatively referred to as 'the first flat surface 934S', and the third side 936 of the fourth pillar 646 has an eighth flat surface 936S, alternatively referred to as 'the second flat surface 936S', perpendicular to an edge of the seventh flat surface 934S. The curved surface 932S, the seventh flat surface 934S and the eighth flat surface 936S together define an outer surface of the fourth pillar 646.

As shown in FIG. 9C, the fourth pillar 646 has a first blind hole 942A near a first end 938A of the second side 934, a second blind hole 942B near a first end 938B of the third side 936, a third blind hole 942C near a second end 940A of the second side 934, and a fourth blind hole 942D near a second end 940B of the third side 936, a fifth blind hole 942E at a center 932C of the second side 934 and a sixth blind hole 942F at a center 936C of the third side 936. Particularly, the first blind hole 942A, the third blind hole 942C and the fifth blind hole 942E are defined in the seventh flat surface 934S, and the second blind hole 942B, the fourth blind hole 942D and the sixth blind hole 942F are defined in the eighth flat surface 936S. The first blind hole 942A, the second blind hole 942B, the third blind hole 942C, and the fourth blind hole 942D, the fifth blind hole 942E and the sixth blind hole 942F are collectively referred to as 'the blind holes 650' and individually referred to as 'the blind hole 650' unless otherwise specifically mentioned. The first end 938A of the second side 934 and the first end 938B of the third side 936 are collectively or individually referred to as 'the first end(s) 938' of the fourth pillar 646 and the second end 940A of the second side 934 and the second end 940B of the third side 936 are collectively or individually referred to as 'the second end(s) 940' of the third pillar 644 unless otherwise specifically mentioned.

Figure 10:
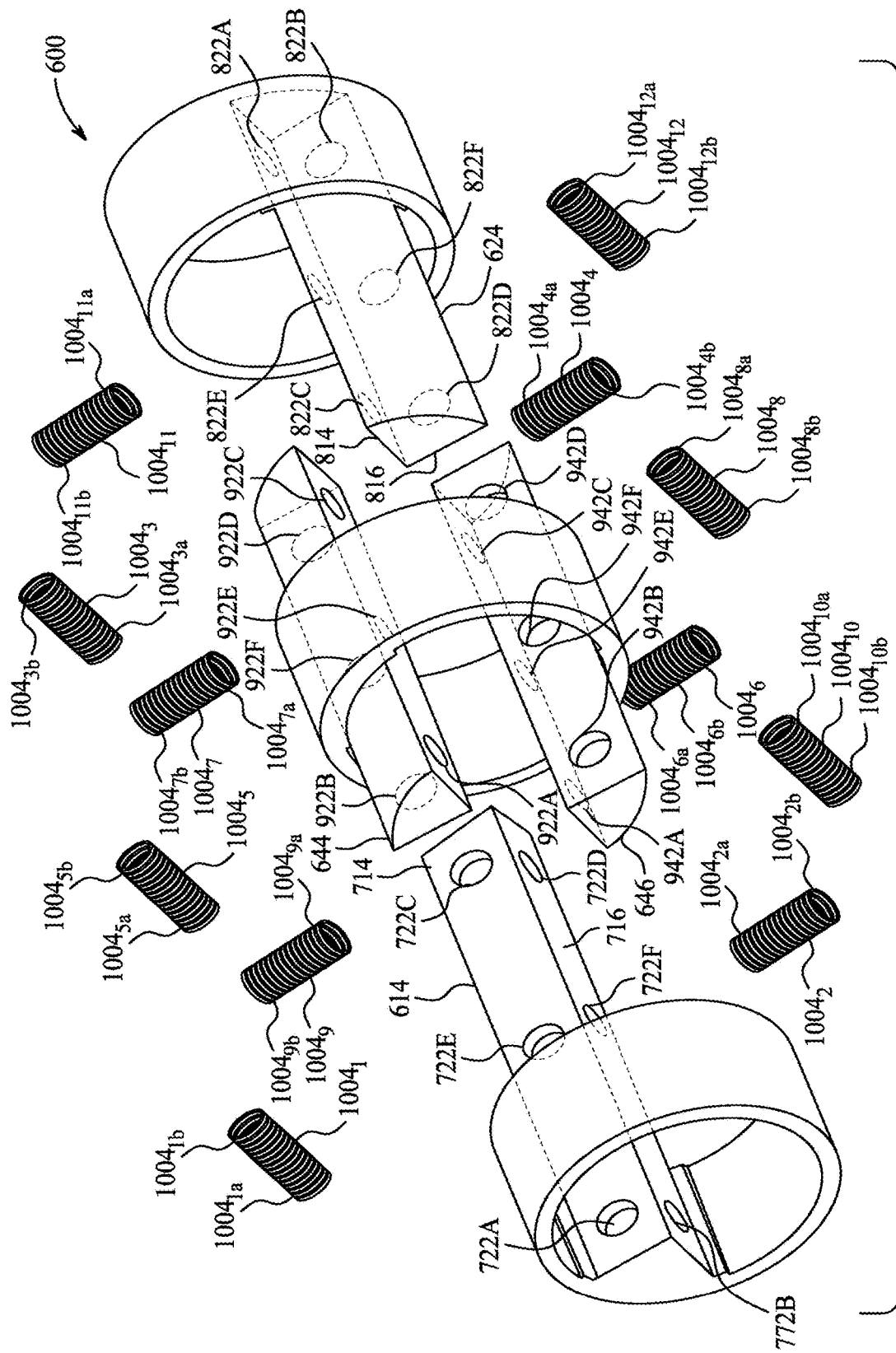
FIG. 10 is an exploded view of the double-ended flexure bearing, according to certain embodiments.

Referring to FIG. 10, an exploded view of the double-ended flexure bearing 600 is illustrated. The double-ended flexure bearing 600 may include a plurality of end caps, identical to the end caps 402 of the flexure bearing 100, configured to attach with the plurality of blind holes 650 of the pillars 648 of the sleeves 640 and the central rotor ring 642. During an assembly of the double-ended flexure bearing 600, in one example, the end caps may be firmly engaged within the blind holes 650 such that the sleeves 640 and the blind holes 650 may be formed as one component. In another example, the end caps may be attached to the ends of the compression springs 630 such that the compression springs 630 and the end caps together may be formed as one component.

The plurality of compression springs 630 includes a first compression spring $1004_1$ having a first spring end $1004_{1a}$ and a second spring end $1004_{1b}$, a second compression spring $1004_2$ having a first spring end $1004_{2a}$ and a second spring end $1004_{2b}$, a third compression spring $1004_3$ having a first spring end $1004_{3a}$ and a second spring end $1004_{3b}$, a fourth compression spring $1004_4$ having a first spring end $1004_{4a}$ and a second spring end $1004_{4b}$, a fifth compression spring $1004_5$ having a first spring end $1004_{5a}$ and a second spring end $1004_{5b}$, a sixth compression spring $1004_6$ having a first spring end $1004_{6a}$ and a second spring end $1004_{6b}$, a seventh compression spring $1004_7$ having a first spring end $1004_{7a}$ and a second spring end $1004_{7b}$, an eighth compression spring $1004_8$ having a first spring end $1004_{8a}$ and a second spring end $1004_{8b}$, a ninth compression spring $1004_9$ having a first spring end $1004_{9a}$ and a second spring end $1004_{9b}$, a tenth compression spring $1004_{10}$ having a first spring end $1004_{10a}$ and a second spring end $1004_{10b}$, an eleventh compression spring $1004_{11}$ having a first spring end $1004_{11a}$ and a second spring end $1004_{11b}$ and a twelfth compression spring $1004_{12}$ having a first spring end $1004_{12a}$ and a second spring end $1004_{12b}$ configured to rotatably couple the first outer sleeve 610 and the second outer sleeve 620 with the central rotor ring 642. The plurality of compression springs 630 may be individually referred to as 'the compression spring 630' unless otherwise specifically mentioned. The compression spring 630 may be alternatively referred to 'the spring 630' and, for example, the first compression spring $1004_1$ may be alternatively referred to as 'the first spring $1004_1$' and so on. The compression spring 630 is a helical compression spring. Each compression spring 630 has a first spring end configured to fit into one of the blind holes 650 of one of the pillars 648 and a second spring end configured to fit into a corresponding blind hole 650 of an adjacent pillar 648 when the first outer sleeve 610 and the second outer sleeve 620 are interconnected with the central rotor ring 642.

Figure 11:
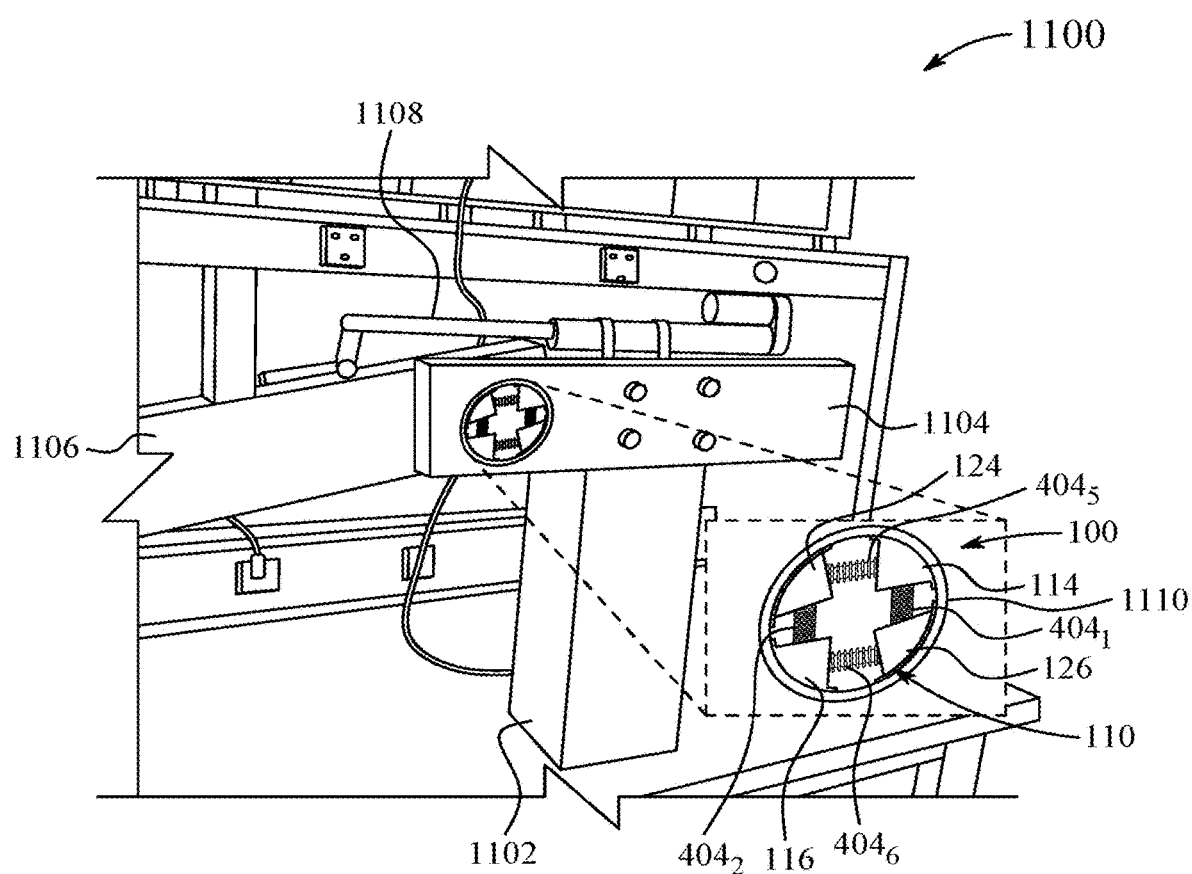
FIG. 11 is an exemplary illustration of implementation of the flexure bearing of FIG. 1 in an industrial application, according to certain embodiments.

Referring to FIG. 11, an exemplary illustration of an implementation of the flexure bearing 100 of FIG. 1 in a mechanical system 1100 is illustrated. As shown in FIG. 11, the flexure bearing 100 is implemented in the mechanical system 1100 having a support leg 1102, a bar 1104 horizontally attached to the support leg 1102 and an arm 1106 movably coupled to the bar 1104. A linear actuator 1108 is coupled to the bar 1104 and the arm 1106 to support movement of the arm 1106 with respect to the bar 1104. The bar 1104 includes a first opening 1110 configured to engage with the first sleeve 110 and the arm 1106 includes a second opening (not shown) configured to engage with the second sleeve 120. Particularly, the first opening 1110 may have a diameter equal to the diameter of the first circular body 112 of the first sleeve 110 and the second opening may have a diameter equal to the diameter of the second circular body 122 of the second sleeve 120 as such the flexure bearing 100 may be engaged with the bar 1104 and the arm 1106 using press fit, interference fit, or any other mechanisms known in the art. When the linear actuator 1108 is actuated, the flexure bearing 100 facilitates rotational movement of the arm 1106 relative to the bar 1104 with respect to the central axis 'L' thereof. In the present implementation, a rotation angle achieved between the bar 1104 and the arm 1106 is 60 degrees, which is higher than the rotation angle ±20° achieved by the existing design. Particularly, the third pillar 124 and the fourth pillar 126 of the second sleeve 120 rotate anticlockwise while the first pillar 114 and the second pillar 116 of the first sleeve 110 remain stationary. As such, the first compression spring $404_1$ and the second compression spring $404_2$ are compressed further and the fifth compression spring $404_5$ and the sixth compression spring $404_6$ are expanded. At the same time, the third compression spring $404_3$ and the fourth compression spring $404_4$ are compressed further and the seventh compression spring $404_7$ and the eighth compression spring $404_8$ are expanded.

The flexure bearing 100 of the present disclosure helps to achieve a larger rotation angle of ±30° compared to the rotation angle of ±20° achieved by the existing design. Further, the arrangement of the compression springs 130 helps the flexure bearing 100 to mitigate fatigue failure which is otherwise caused due to the arrangements of blades within the existing design, thereby the fatigue life of the flexure bearing 100 may be enhanced, especially, at high speed applications. Additionally, the compression springs 130 facilitate replacement and maintenance of the flexure bearing 100 more easily and more economically. Further, the flexure bearing 100 helps to absorb vibrations with the help of the compression springs 130, which would otherwise be difficult with blades arrangement, and can be useful in applications where vibrations cause damage or lead to failure of equipment. Moreover, design of the flexure bearing 100 has a higher acceptable corrosion rate compared to the existing bearings as the acceptable corrosion rate of the existing bearings is very small because of the tight dimensional tolerance. The double-ended flexure bearing 600 can be implemented in a mechanical system having three movable elements, in which two elements may be movable relative to a third element. Each of the three elements may be attached to each of the first outer sleeve 610, the second outer sleeve 620, and the central roto ring 642. The aforementioned advantages may also be achieved with the double-ended flexure bearing 600.

The flexure bearing 100 and the double-ended flexure bearing 600 can be used in space applications (vacuum) as the requirement of lubrication is eliminated and food production equipment in the food industry as there is no risk of lubrication leakage. Various applications including, but not limited to, robotics and assembly line operations in the automobile industry can bed benefited using the flexure bearing 100 and the double-ended flexure bearing 600 of the present disclosure. In an example, the flexure bearing 100 or the double-ended flexure bearing 600 can be used as a humanoid robot neck connecting body to head, and the robot wiring can be easily connected through a gap defined at the center thereof.

Figure 12:
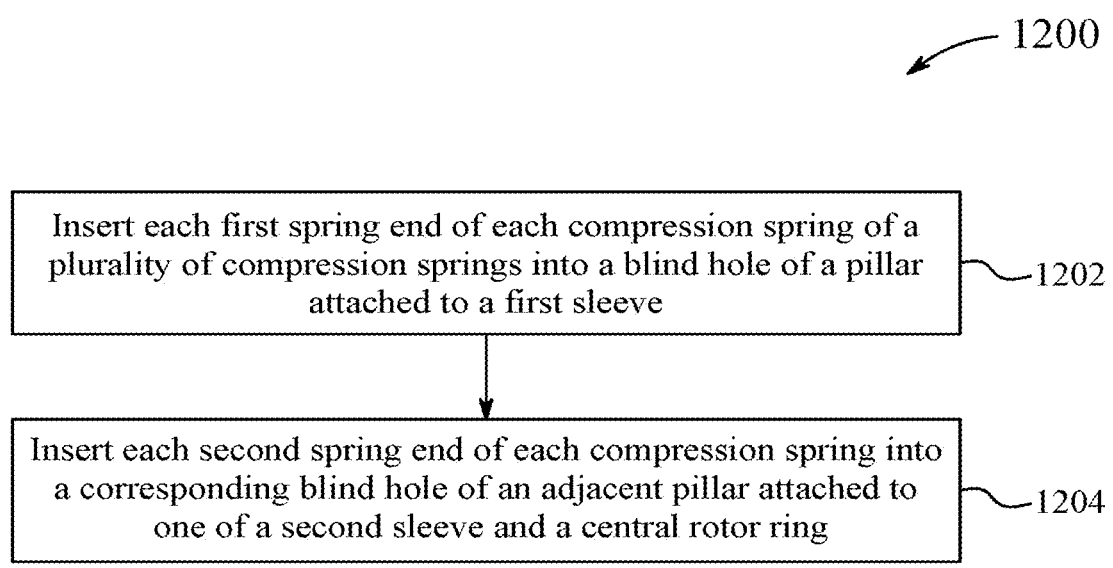
FIG. 12 is an exemplary flowchart of a method of assembling the flexure bearing of FIG. 1 and the double-ended flexure bearing of FIG. 6, according to certain embodiments.

Referring to FIG. 12, a schematic flowchart of a method 1200 of assembling the flexure bearing 100 and the double-ended flexure bearing 600 is illustrated. Referring to FIGS. 1 to 5B, at step 1202, the method 1200 includes inserting each first spring end of each compression spring 130 of the plurality of compression springs 130 into the blind hole 150 of the pillar 148 attached to the first sleeve 110. In particular, the method 1200 includes inserting the first pillar 114 and the second pillar 116 of the first sleeve 110 between the third pillar 124 and the fourth pillar 126 of the second sleeve 120. In one example, the end caps 402 may be press fitted within the blind holes 150 of the pillars 148 of the sleeves 140 during manufacturing thereof. In an alternate example, the end caps 402 may be engaged with the blind holes 150 of the pillars 148 of the sleeves 140 during the assembly of the flexure bearing 100. The method 1200 further includes abutting the first sleeve 110 against the second sleeve 120. The first sleeve 110 and the second sleeve 120 are coupled in such a way that the gap 160 is defined therebetween.

At step 1204, the method 1200 includes inserting each second spring end of each compression spring 130 into the corresponding blind hole 150 of the adjacent pillar 148, such as the third pillar 124 and the fourth pillar 126, attached to the second sleeve 120. The method 1200 also includes compressing each compression spring 130 before inserting each second spring end of each compression spring 130 into the corresponding blind hole 150 of the adjacent pillar 148. The method 1200 of inserting each first spring end and each second spring end of each of the plurality of compression springs 130 includes inserting the first spring end $404_{1a}$ of the first spring $404_1$ into the first blind hole 222A of the first end 218 of the first pillar 114 and inserting the second spring end $404_{1b}$ of the first spring $404_1$ into the third blind hole 342C of the second end 340 of the fourth pillar 126. The method 1200 further includes inserting the first spring end $404_{2a}$ of the second spring $404_2$ into the first blind hole 242A of the first end 238 of the second pillar 116 and inserting the second spring end $404_{2b}$ of the second spring $404_2$ into the fourth blind hole 322D of the second end 320 of the third pillar 124. The method 1200 further includes inserting the first spring end $404_{3a}$ of the third spring $404_3$ into the third blind hole 222C of the second end 220 of the first pillar 114 and inserting the second spring end $404_{3b}$ of the third spring $404_3$ into the first blind hole 342A of the first end 338 of the fourth pillar 126. The method 1200 further includes inserting the first spring end $404_{4a}$ of the fourth spring $404_4$ into the third blind hole 242C of the second end 240 of the second pillar 116 and inserting the second spring end $404_{4b}$ of the fourth spring $404_4$ into the second blind hole 322B of the first end 318 of the third pillar 124. The method 1200 further includes inserting the first spring end $404_{5a}$ of the fifth spring $404_5$ into the second blind hole 222B of the first end 218 of the first pillar 114 and inserting the second spring end $404_{5b}$ of the fifth spring $404_5$ into the third blind hole 322C of the second end 320 of the third pillar 124. The method 1200 further includes inserting the first spring end $404_{6a}$ of the sixth spring $404_6$ into the second blind hole 242B of the first end 238 of the second pillar 116 and inserting the second spring end $404_{6b}$ of the sixth spring $404_6$ into the fourth blind hole 342D of the second end 340 of the fourth pillar 126. The method 1200 further includes inserting the first spring end $404_{7a}$ of the seventh spring $404_7$ into the fourth blind hole 222D of the second end 220 of the first pillar 114 and inserting the second spring end $404_{7b}$ of the seventh spring $404_7$ into the first blind hole 322A of the first end 318 of the third pillar 124. The method 1200 further includes inserting the first spring end $404_{8a}$ of the eighth spring $404_8$ into the fourth blind hole 242D of the second end 240 of the second pillar 116 and inserting the second spring end $404_{8b}$ of the eighth spring $404_8$ into the second blind hole 342B of the first end 338 of the fourth pillar 126.

Referring to FIG. 6 through FIG. 10, at the step 1202, the method 1200 includes inserting each first spring end of each compression spring 630 of the plurality of compression springs 630 into the blind hole 650 of the pillar 648 attached to the first sleeve 610. In particular, the method 1200 includes inserting the first pillar 614 of the first sleeve 610 between the third pillar 644 and the fourth pillar 646 of the central rotor ring 642 until the first sleeve 610 abuts the first edge 652 of the central rotor ring 642. The method 1200 further includes inserting the second pillar 624 of the second sleeve 620 between the third pillar 644 and the fourth pillar 646 of the central rotor ring 642 until the second sleeve 620 abuts the second edge 654 of the central rotor ring 642. Further, the method 1200 includes inserting the first spring end of each of the plurality of compression springs 630 into one of the blind holes 650.

At the step 1204, the method 1200 includes inserting each second spring end of each compression spring 630 into the corresponding blind hole 650 of the adjacent pillar 648 attached to one of the second sleeve 620 and the central rotor ring 642. The method 1200 also includes compressing each compression spring 630 before inserting each second spring end of each compression spring 630 into the corresponding blind hole 650 of the adjacent pillar 648. The method 1200 further includes inserting each second spring end of each compression spring 630 of a first set of the plurality of compression springs 630 into a corresponding blind hole 650 of an adjacent pillar 648 attached to one of the first sleeve 610 and the second sleeve 620 and inserting each second spring end of each compression spring 630 of a second set of the plurality of compression springs 630 into a corresponding blind hole 650 of an adjacent pillar 648 attached to the central rotor ring 642.

The method 1200 of inserting each first spring end and each second spring end of the first set of the plurality of compression springs 630 includes inserting the first spring end $1004_{1a}$ of the first spring $1004_1$ into the first blind hole 722A near the first end 718 of the first pillar 614 and inserting the second spring end $1004_{1b}$ of the first spring $1004_1$ into the second blind hole 922B of the third pillar 644. The method 1200 further includes inserting the first spring end $1004_{2a}$ of the second spring $1004_2$ into the second blind hole 722B near the first end 718 of the first pillar 614 and inserting the second spring end $1004_{2b}$ of the second spring $1004_2$ into the first blind hole 942A of the fourth pillar 646. The method 1200 further includes inserting the first spring end $1004_{3a}$ of the third spring $1004_3$ into the third blind hole 722C near the second end 720 of the first pillar 614 and inserting the second spring end $1004_{3b}$ of the third spring $1004_3$ into the fourth blind hole 922D near the second end 920 of the third pillar 644. The method 1200 further includes inserting the first spring end $1004_{4a}$ of the fourth spring $1004_4$ into the fourth blind hole 722D near the second end 720 of the first pillar 614 and inserting the second spring end $1004_{4b}$ of the fourth spring $1004_4$ into the third blind hole 942C near the second end 940 of the fourth pillar 646. The method 1200 further includes inserting the first spring end $1004_{5a}$ of the fifth spring $1004_5$ into the fifth blind hole 722E at the center 714C of the second side 714 of the first pillar 614 and inserting the second spring end $1004_{5b}$ of the fifth spring $1004_5$ into the sixth blind hole 922F at the center 916C of the third side 916 of the third pillar 646. The method 1200 further includes inserting the first spring end $1004_{6a}$ of the sixth spring $1004_6$ into the sixth blind hole 722F at the center 716C of the third side 716 of the first pillar 614 and inserting the second spring end $1004_{6b}$ of the sixth spring $1004_6$ into the fifth blind hole 942E at the center 934C of the second side 934 of the fourth pillar 646. The method 1200 further includes inserting the first spring end $1004_{7a}$ of the seventh spring $1004_7$ into the fifth blind hole 822E at the center 814C of the second side 814 of the second pillar 624 and inserting the second spring end $1004_{7b}$ of the seventh spring $1004_7$ into the fifth blind hole 922E at the center 914C of the second side 914 of the third pillar 644. The method 1200 further includes inserting the first spring end $1004_{8a}$ of the eighth spring $1004_8$ into the sixth blind hole 822F at the center 816C of the third side 816 of the second pillar 624 and inserting the second spring end $1004_{8b}$ of the eighth spring $1004_8$ into the sixth blind hole 942F at the center 936C of the third side 936 of the fourth pillar 646.

The method 1200 of inserting each first spring end and each second spring end of the second set of the plurality of compression springs 630 includes inserting the first spring end $1004_{9a}$ of the ninth spring $1004_9$ into the third blind hole 822C of the second end 820 of the second pillar 624 and inserting the second spring end $1004_{9b}$ of the ninth spring $1004_9$ into the first blind hole 922A of the first end 918 of the third pillar 646. The method 1200 further includes inserting the first spring end $1004_{10a}$ of the tenth spring $1004_{10}$ into the fourth blind hole 822D of the second end 820 of the second pillar 624 and inserting the second spring end $1004_{10b}$ of the tenth spring $1004_{10}$ into the second blind hole 942B of the first end 938 of the fourth pillar 646. The method 1200 further includes inserting the first spring end $1004_{11a}$ of the eleventh spring $1004_{11}$ into the first blind hole 822A of the first end 818 of the second pillar 624 and inserting the second spring end $1004_{11b}$ of the eleventh spring $1004_{11}$ into the third blind hole 922C of the second end 920 of the third pillar 644. The method 1200 further includes inserting the first spring end $1004_{12a}$ of the twelfth spring $1004_{12}$ into the second blind hole 822B of the first end 818 of the second pillar 624 and inserting the second spring end $1004_{12b}$ of the twelfth spring $1004_{12}$ into the fourth blind hole 942D of the second end 940 of the fourth pillar 646.

The first embodiment of the present disclosure is illustrated with respect to FIG. 1 to FIG. 5B, and FIG. 11. The first embodiment describes the flexure bearing 100. The flexure bearing 100 comprising the first sleeve 110 and the second sleeve 120, wherein each sleeve 140 includes the first pillar 114, 124 having three sides, wherein the first end 218, 318 of the first pillar 114, 124 is attached to an inside wall of the sleeve 140, and the second end 220, 320 of the first pillar 114, 124 projects outwardly from the sleeve 140 parallel to the axis 'L1', 'L2' of the sleeve 140; and the second pillar 116, 126 having three sides, wherein the first end 238, 338 of the second pillar 116, 126 is attached to the inside wall of the sleeve 140, and the second end 240, 340 of the second pillar 116, 126 projects outwardly from the sleeve 140 such that the second pillar 116, 126 is parallel to and diametrically opposed to the first pillar 114, 124; the flexure bearing 100 comprising a plurality of blind holes 150, each blind hole 150 near each of the first end 218, 238, 318, 338 and the second end 220, 240, 320, 340 of each pillar 148; and the plurality of compression springs 130, each compression spring 130 having a first spring end configured to fit into one of the blind holes 150 of a pillar 148 of the first sleeve 110 and a second spring end configured to fit into a corresponding blind hole 150 of an adjacent pillar 148 of the second sleeve 120 when the second sleeve 120 is interconnected to the first sleeve 110.

In the flexure bearing 100, the first side 212, 232, 312, 332 of each pillar 148 is shaped to conform to the sector of the inner surface 206, 306 of the sleeve 140, the second side 214, 234, 314, 334 of each pillar 148 has the first flat surface 214S, 234S, 314S, 334S, and the third side 216, 236, 316, 336 of each pillar 148 has the second flat surface 216S, 236S, 316S, 336S perpendicular to the edge of the first flat surface 214S, 234S, 314S, 334S.

In the flexure bearing 100, each pillar 148 has the first blind hole 222A, 242A, 322A, 342A near the first end 218A, 238A, 318A, 338A of the second side 214, 234, 314, 334, the second blind hole 222B, 242B, 322B, 342B near the first end 218B, 238B, 318B, 33B of the third side 216, 236, 316, 336, a third blind hole 222C, 242C, 322C, 342C near the second end 220A, 240A, 320A, 340A of the second side 214, 234, 314, 334 and the fourth blind hole 222D, 242D, 322D, 342D near the second end 220B, 240B, 320B, 340B of the third side 216, 236, 316, 336.

The flexure bearing 100 further comprises the first end cap 402 configured to hold the first spring end and the second end cap 402 configured to hold the second spring end.

In the flexure bearing 100, the diameter of each end cap 402 is equal to the diameter of the blind hole 150 and the length of each end cap 402 is equal to the depth of the blind hole 150.

In the flexure bearing 100, each compression spring 130 is a helical compression spring.

In the flexure bearing 100, each compression spring 130 has the length at least three times of the depth of the blind hole 150.

The second embodiment of the present disclosure is illustrated with respect to FIG. 6 to FIG. 10. The second embodiment describes the double-ended flexure bearing 600. The double-ended flexure bearing 600 comprises the first outer sleeve 610 including the first pillar 614 which projects outwardly from the first outer sleeve 610 in the first direction 'D1'; the second outer sleeve 620 including the second pillar 624 which projects outwardly from the second outer sleeve 620 in the second direction 'D2'; the central rotor ring 642 having the axis 'LA3' concentric with the first outer sleeve 610 and the second outer sleeve 620, the central rotor ring 642 configured to engage with and connect to the first outer sleeve 610 and the second outer sleeve 620 along the axis 'LA3', the central rotor ring 642 including the third pillar 644 which projects outwardly from the central rotor ring 642 in the first direction 'D1' and in the second direction 'D2'; the fourth pillar 646 which projects outwardly from the central rotor ring 642 in the first direction 'D1' and in the second direction ' 'D2; the plurality of blind holes 650 in each pillar 648; and the plurality of compression springs 630 configured to connect each of the plurality of blind holes 650 of each pillar 648 to the blind hole 650 of the adjacent pillar 648, such that the first outer sleeve 610 abuts the first edge 652 of the central rotor ring 642 and the second outer sleeve 620 abuts the second edge 654 of the central rotor ring 642.

In the double-ended flexure bearing 600, each pillar 648 has three sides, including the first side 712, 812, 912, 932 shaped to conform to the inside wall of one of the first outer sleeve 610, the second outer sleeve 620 and the central rotor ring 642; the second side 714, 814, 914, 934 having the first flat surface 714S, 814S, 914S, 934S; the third side 716, 816, 916, 936 having the second flat surface 716S, 816S, 916S, 936S perpendicular to the edge of the first flat surface 714S, 814S, 914S, 934S; the first end 718, 818, 918, 938; the second end 720, 820, 920, 940; and the center 714C, 716C, 814C, 816C, 914C, 916C, 934C, 936C.

In the double-ended flexure bearing 600, the first end 718C of the first side 712 of the first pillar 614 is attached to the first inside wall of the first outer sleeve 620; the first end 818C of the first side 812 of the second pillar 624 is attached to the second inside wall of the second outer sleeve 620; the center 912C of the first side 912 of the third pillar 644 is attached to the first sector of the third inside wall of the central rotor ring 642; and the center 932C of the first side 932 of the fourth pillar 646 is attached to the second sector of the third inside wall of the central rotor ring 642, wherein the first sector is diametrically opposed to the second sector.

In the double-ended flexure bearing 600, each pillar 648 has the first blind hole 722A, 822A, 922A, 942A near the first end 718A, 818A, 918A, 938A of the second side 714, 814, 914, 934, the second blind hole 722B, 822B, 922B, 942B near the first end 718B, 818B, 918B, 938B of the third side 716, 816, 916, 936, the third blind hole 722C, 822C, 922C, 942C near the second end 720A, 820A, 920A, 940A of the second side 714, 814, 914, 934, the fourth blind hole 722D, 822D, 922D, 942D near the second end 720B, 820B, 920B, 940B of the third side 716, 816, 916, 936, the fifth blind hole 722E, 822E, 922E, 942E at the center 714C, 814C, 914C, 934C of the second side 714, 814, 914, 934 and the sixth blind hole 722F, 822F, 922F, 942F at the center 716C, 816C, 916C, 936C of the third side 716, 816, 916, 936.

In the double-ended flexure bearing 600, each compression spring 630 has the first spring end configured to fit into one of the blind holes 650 of one of the pillars 648, and the second spring end configured to fit into the corresponding blind hole 650 of the adjacent pillar 648 when the first and second outer sleeves 610, 620 are interconnected to the central rotor ring 642.

In the double-ended flexure bearing 600, the first side 712 of the first pillar 614 is shaped to conform to the first sector of the inner surface 706 of the first outer sleeve 610; the second side 714 of the first pillar 614 has the first flat surface 714S; the third side 716 of the first pillar 614 has the second flat surface 716S perpendicular to the edge of the first flat surface 714S; the first side 812 of the second pillar 624 is shaped to conform to the second sector of the inner surface 806 of the second outer sleeve 620; the second side 814 of the second pillar 624 has the third flat surface 814S; the third side 816 of the second pillar 624 has the fourth flat surface 816S perpendicular to the edge of the third flat surface 814S; the first side 912 of the third pillar 644 is shaped to conform to the third sector of the inner surface 906 of the central rotor ring 642, the second side 914 of the third pillar 644 has the fifth flat surface 914S, the third side 916 of the third pillar 624 has the sixth flat surface 916S perpendicular to the edge of the fifth flat surface 914S; the first side 932 of the fourth pillar 646 is shaped to conform to the fourth sector of the inner surface 906 of the central rotor ring 642, the second side 934 of the fourth pillar 646 has the seventh flat surface 934S, the third side 936 of the fourth pillar 646 has the eighth flat surface 936S perpendicular to the edge of the seventh flat surface 934S; and wherein each pillar 648 has the first blind hole 722A, 822A, 922A, 942A near the first end 718A, 818A, 918A, 938A of the second side 714, 814, 914, 934, the second blind hole 722B, 822B, 922B, 942B near the first end 718B, 818B, 918B, 938B of the third side 716, 816, 916, 936, the third blind hole 722C, 822C, 922C, 942C near the second end 720A, 820A, 920A, 940A of the second side 714, 814, 914, 934, the fourth blind hole 722D, 822D, 922D, 942D near the second end 720B, 820B, 920B, 940B of the third side 716, 816, 916, 936, the fifth blind hole 722E, 822E, 922E, 942E at the center 714C, 814C, 914C, 934C of the second side 714, 814, 914, 934 and the sixth blind hole 722F, 822F, 922F, 942F at the center 716C, 816C, 916C, 936C of the third side 716, 816, 916, 936.

The third embodiment of the present disclosure is illustrated with respect to FIG. 1 to FIG. 12. The third embodiment describes the method 1200 of assembling the flexure bearing 100 and the double-ended flexure bearing 600. The method 1200 comprises inserting each first spring end of each compression spring 130, 630 of the plurality of compression springs 130, 630 into the blind hole 150, 650 of the pillar 148, 648 attached to the first sleeve 110, 610; and inserting each second spring end of each compression spring 130, 630 into the corresponding blind hole 150, 650 of the adjacent pillar attached to one of the second sleeve 120 and the central rotor ring 642.

The method 1200 further comprises inserting the first pillar 114 and the second pillar 116 of the first sleeve 110 between the third pillar 124 and the fourth pillar 126 of the second sleeve 120; abutting the first sleeve 110 against the second sleeve 120; and inserting each second spring end of each compression spring 130 into the corresponding blind hole 150 of the adjacent pillar 148 attached to the second sleeve 120.

The method 1200 of inserting each first spring end and each second spring end of the plurality of compression springs 130 includes inserting the first spring end $404_{1a}$ of the first spring $404_1$ into the first blind hole 222A of the first end 218 of the first pillar 114; inserting the second spring end $404_{1b}$ of the first spring $404_1$ into the third blind hole 342C of the second end 340 of the fourth pillar 126; inserting the first spring end $404_{2a}$ of the second spring $404_2$ into the first blind hole 242A of the first end 238 of the second pillar 116; inserting the second spring end $404_{2b}$ of the second spring $404_2$ into the fourth blind hole 322D of the second end 320 of the third pillar 124; inserting the first spring end $404_{3a}$ of the third spring $404_3$ into the third blind hole 222C of the second end 220 of the first pillar 114; inserting the second spring end $404_{3b}$ of the third spring $404_3$ into the first blind hole 342A of the first end 338 of the fourth pillar 126; inserting the first spring end $404_{4a}$ of the fourth spring $404_4$ into the third blind hole 242C of the second end 240 of the second pillar 116; inserting the second spring end $404_{4b}$ of the fourth spring $404_4$ into the second blind hole 322B of the first end 318 of the third pillar 124; inserting the first spring end $404_{5a}$ of the fifth spring $404_5$ into the second blind hole 222B of the first end 218 of the first pillar 114; inserting the second spring end $404_{5b}$ of the fifth spring $404_5$ into the third blind hole 322C of the second end 320 of the third pillar 124; inserting the first spring end $404_{6a}$ of the sixth spring $404_6$ into the second blind hole 242B of the first end 238 of the second pillar 116; inserting the second spring end $404_{6b}$ of the sixth spring $404_6$ into the fourth blind hole 342D of the second end 340 of the fourth pillar 126; inserting the first spring end $404_{7a}$ of the seventh spring $404_7$ into the fourth blind hole 222D of the second end 220 of the first pillar 114; inserting the second spring end $404_{7b}$ of the seventh spring $404_7$ into the first blind hole 322A of the first end 318 of the third pillar 124; inserting the first spring end $404_{8a}$ of the eighth spring $404_8$ into the fourth blind hole 242D of the second end 240 of the second pillar 116; and inserting the second spring end $404_{8b}$ of the eighth spring $404_8$ into the second blind hole 342B of the first end 338 of the fourth pillar 126.

The method 1200 further comprises inserting the first pillar 614 of the first sleeve 610 between the third pillar 644 and the fourth pillar 646 of the central rotor ring 642 until the first sleeve 610 abuts the first edge 652 of the central rotor ring 642; inserting the second pillar 624 of the second sleeve 620 between the third pillar 644 and the fourth pillar 646 of the central rotor ring 642 until the second sleeve 620 abuts the second edge 654 of the central rotor ring 642; inserting the first spring end of each of the plurality of compression springs 630 into one of plurality of blind holes 650; and inserting each second spring end of each compression spring 630 of the first set of the plurality of compression springs 630 into the corresponding blind hole 650 of the adjacent pillar 648, wherein the adjacent pillar 648 is attached to one of the first sleeve 610 and the second sleeve 620; and inserting each second spring end of each compression spring 630 of the second set of the plurality of compression springs into the corresponding blind hole 650 of the adjacent pillar 648 attached to the central rotor ring 642.

The method 1200 of inserting each first spring end and each second spring end of the first set of the plurality of compression springs 630 includes inserting the first spring end $1004_{1a}$ of the first spring $1004_1$ into the first blind hole 722A near the first end 718 of the first pillar 614; inserting the first spring end $1004_{2a}$ of the second spring $1004_2$ into the second blind hole 722B near the first end 718 of the first pillar 614; inserting the second spring end $1004_{1b}$ of the first spring $1004_1$ into the second blind hole 922B near the first end 918 of the third pillar 644; inserting the second spring end $1004_{2b}$ of the second spring $1004_2$ into the first blind hole 942A near the first end 938 of the fourth pillar 646; inserting the first spring end $1004_{3a}$ of the third spring $1004_3$ into the third blind hole 722C near the second end 720 of the first pillar 614; inserting the first spring end $1004_{4a}$ of the fourth spring $1004_4$ into the fourth blind hole 722D near the second end 720 of the first pillar 614; inserting the second spring end $1004_{3b}$ of the third spring $1004_3$ into the fourth blind hole 922D near the second end 920 of the third pillar 644; inserting the second spring end $1004_{4b}$ of the fourth spring $1004_4$ into the third blind hole 942C near the second end 940 of the fourth pillar 646; inserting the first spring end $1004_{5a}$ of the fifth spring $1004_5$ into the fifth blind hole 722E at the center 714C of the second side 714 of the first pillar 614; inserting the second spring end $1004_{5b}$ of the fifth spring $1004_5$ into the sixth blind hole 922F at the center 916C of the third side 916 of the third pillar 646; inserting the first spring end $1004_{6a}$ of the sixth spring $1004_6$ into the sixth blind hole 722F at the center 716C of the third side 716 of the first pillar 614; inserting the second spring end $1004_{6b}$ of the sixth spring $1004_6$ into the fifth blind hole 942E at the center 934C of the second side 934 of the fourth pillar 646; inserting the first spring end $1004_{7a}$ of the seventh spring $1004_7$ into the fifth blind hole 822E at the center 814C of the second side 814 of the second pillar 624; inserting the second spring end $1004_{7b}$ of the seventh spring $1004_7$ into the fifth blind hole 922E at the center 914C of the second side 914 of the third pillar 644; inserting the first spring end $1004_{8a}$ of the eighth spring $1004_8$ into the sixth blind hole 822F at the center 816C of the third side 816 of the second pillar 624; and inserting the second spring end $1004_{8b}$ of the eighth spring $1004_8$ into the sixth blind hole 942F at the center 936C of the third side 936 of the fourth pillar 646.

The method of inserting each first spring end and each second spring end of the second set of the plurality of compression springs 630 includes inserting the first spring end $1004_{9a}$ of the ninth spring $1004_9$ into the third blind hole 822C of the second end 820 of the second pillar 624; inserting the first spring end $1004_{10a}$ of the tenth spring $1004_{10}$ into the fourth blind hole 822D of the second end 820 of the second pillar 624; inserting the first spring end $1004_{11a}$ of the eleventh spring $1004_{11}$ into the first blind hole 822A of the first end 818 of the second pillar 624; inserting the first spring end $1004_{12a}$ of the twelfth spring $1004_{12}$ into the second blind hole 822B of the first end 818 of the second pillar 624; inserting the second spring end $1004_{9b}$ of the ninth spring $1004_9$ into the first blind hole 922A of the first end 918 of the third pillar 646; inserting the second spring end $1004_{10b}$ of the tenth spring $1004_{10}$ into the second blind hole 942B of the first end 938 of the fourth pillar 646; inserting the second spring end $1004_{11b}$ of the eleventh spring $1004_{11}$ into the third blind hole 922C of the second end 920 of the third pillar 644; and inserting the second spring end $1004_{12b}$ of the twelfth spring $1004_{12}$ into the fourth blind hole 942D of the second end 940 of the fourth pillar 646.

The method 1200 further comprising compressing each compression spring 130, 630 before inserting each second spring end of each compression spring 130, 630 into the corresponding blind hole 150, 650 of the adjacent pillar 148, 648.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A mechanical system, comprising:
a first mechanical element,
a second mechanical element, and
a flexure bearing that movably couples the first and second mechanical elements;
wherein the flexure bearing comprises:
a first sleeve and a second sleeve, wherein each sleeve includes:
an inside wall having a cylindrical inner surface;
a first pillar having three sides, wherein a first end of the first pillar is attached to the inside wall of the sleeve, and a second end of the first pillar projects outwardly from the sleeve parallel to an axis of the sleeve;
a second pillar having three sides, wherein a first end of the second pillar is attached to the inside wall of the sleeve, and a second end of the second pillar projects outwardly from the sleeve such that the second pillar is parallel to and diametrically opposed to the first pillar;
a plurality of blind holes, each blind hole near each of the first end and the second end of each pillar,
wherein each pillar comprises a first side shaped to conform to a sector of the inner surface of the other of the first and second sleeves, a second side having a first flat surface, and a third side having a second flat surface perpendicular to an edge of the first flat surface;
wherein each pillar has a first blind hole near a first end of the second side, a second blind hole near a first end of the third side, a third blind hole near a second end of the second side and a fourth blind hole near a second end of the third side;
wherein the first and second pillars of each sleeve are received by the inner surface between the first and second pillars of the other sleeve such that the sleeves are rotatably interconnected about the sleeve axis; and
a plurality of compression springs, each compression spring having a first spring end configured to fit into one of the blind holes of a pillar of the first sleeve and a second spring end configured to fit into a corresponding blind hole of an adjacent pillar of the second sleeve when the second sleeve is interconnected to the first sleeve.

2. The mechanical system of claim 1, further comprising:
a first end cap configured to hold the first spring end; and
a second end cap configured to hold the second spring end.

3. The mechanical system of claim 2, wherein a diameter of each end cap is equal to a diameter of the blind hole and a length of each end cap is equal to a depth of the blind hole.

4. The mechanical system of claim 1, wherein each compression spring is a helical compression spring.

5. The mechanical system of claim 1, wherein each compression spring has a length at least three times of a depth of the blind hole.

6. The mechanical system of claim 1, wherein at least one of the first and second mechanical elements is coupled to a linear actuator.

7. The mechanical system of claim 1, wherein at least one of the first and second mechanical elements includes an opening configured to engage with the outer surface of the first sleeve of the flexure bearing.

8. The mechanical system of claim 7, wherein at least one of the first and second mechanical elements has a second opening configured to engage with the second sleeve of the flexure bearing.

9. The mechanical system of claim 1, wherein the flexure bearing is engaged with at least one of the first and second mechanical elements by press fit or interference fit.

10. The mechanical system of claim 1, wherein a rotational angle between the first and second mechanical elements about the flexure bearing is up to 60°.

* * * * *